United States Patent
Lickfelt et al.

(10) Patent No.: US 10,851,578 B2
(45) Date of Patent: *Dec. 1, 2020

(54) SYSTEM AND METHOD FOR DETERMINING AT LEAST ONE ZONE ASSOCIATED WITH AUTOMATIC CONTROL OF A BARRIER

(71) Applicant: Honda Motor Co., Ltd., Tokyo (JP)

(72) Inventors: Brian K. Lickfelt, Powell, OH (US); Kevin Lamm, Pataskala, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,027

(22) Filed: Jan. 3, 2018

(65) Prior Publication Data
US 2019/0048640 A1 Feb. 14, 2019

Related U.S. Application Data

(60) Provisional application No. 62/542,755, filed on Aug. 8, 2017.

(51) Int. Cl.
*G01C 21/12* (2006.01)
*H04W 64/00* (2009.01)
(Continued)

(52) U.S. Cl.
CPC ............ *E05F 15/77* (2015.01); *E04H 6/02* (2013.01); *E04H 6/42* (2013.01); *E05F 15/40* (2015.01);
(Continued)

(58) Field of Classification Search
CPC ........... G07C 2009/00849; G07C 2009/00928; G07C 2209/63; G07C 9/00309; G07C 9/00857; G07C 9/00126; G07C 2209/64; G07C 9/20; G07C 2009/00769; G07C 9/00896; G07C 2009/00793; G07C 9/00182; G07C 9/10; G07C 9/28; E05Y 2900/106; E05Y 2400/66; E05Y 2201/41; E05Y 2201/50; E05Y 2400/59; E05Y 2400/616; E05Y 2400/814; E05Y 2400/822; E05Y 2900/00; E05Y 2900/134;
(Continued)

(56) References Cited

U.S. PATENT DOCUMENTS 5,350,986 A 9/1994 Long et al.
5,625,980 A 5/1997 Teich et al.
(Continued)

OTHER PUBLICATIONS

Office Action of U.S. Appl. No. 15/803,293 dated Jul. 9, 2019, 41 pages.
(Continued)

*Primary Examiner* — Dionne Pendleton
(74) *Attorney, Agent, or Firm* — Rankin, Hill & Clark LLP

(57) ABSTRACT

A system and method for determining at least one zone associated with automatic control of a barrier that include determining a traveling direction of a vehicle with respect to the barrier. The system and method also include determining at least one dynamic status zone associated with the barrier based on the traveling direction of the vehicle. The system and method additionally include determining at least one barrier control zone associated with the barrier based on the at least one dynamic status zone.

20 Claims, 7 Drawing Sheets

(51) Int. Cl.
| | | |
|---|---|---|
| H04W 4/04 | (2009.01) | |
| E05F 15/77 | (2015.01) | |
| E05F 15/73 | (2015.01) | |
| H04W 4/021 | (2018.01) | |
| G07C 9/20 | (2020.01) | |
| G01S 17/04 | (2020.01) | |
| G01S 19/51 | (2010.01) | |
| G05B 15/02 | (2006.01) | |
| E05F 15/40 | (2015.01) | |
| E04H 6/02 | (2006.01) | |
| E04H 6/42 | (2006.01) | |
| H04L 12/28 | (2006.01) | |
| G01S 19/41 | (2010.01) | |
| E05F 15/668 | (2015.01) | |
| G07C 9/00 | (2020.01) | |

(52) U.S. Cl.
CPC ............. *E05F 15/73* (2015.01); *G01S 17/04* (2020.01); *G01S 19/41* (2013.01); *G01S 19/51* (2013.01); *G05B 15/02* (2013.01); *G07C 9/20* (2020.01); *H04L 12/2829* (2013.01); *H04W 4/021* (2013.01); *E05F 15/668* (2015.01); *E05F 2015/763* (2015.01); *E05F 2015/767* (2015.01); *E05Y 2400/45* (2013.01); *E05Y 2400/818* (2013.01); *E05Y 2800/426* (2013.01); *E05Y 2900/106* (2013.01); *E05Y 2900/40* (2013.01); *G07C 2009/00928* (2013.01)

(58) Field of Classification Search
CPC ......... E05Y 2201/652; E05Y 2201/656; E05Y 2400/324; E05Y 2400/328; E05Y 2400/512; E05Y 2800/00; E05Y 2800/424; E05Y 2900/40; E05Y 2400/45; E05Y 2400/818; E05Y 2800/426; E05Y 2400/44; E05Y 2201/654; E05Y 2400/32; E05Y 2400/81; E05Y 2900/50; E05Y 2400/82; E05Y 2900/104; E05F 15/77; E05F 15/70; E05F 15/00; E05F 15/72; E05F 1/006; E05F 1/02; E05F 15/40; E05F 15/41; E05F 15/42; E05F 15/643; E05F 15/73; E05F 15/75; E05F 15/76; E05F 2015/763; E05F 2015/767; E05F 15/668; E05F 15/79; G08C 17/02; G08C 2201/91; G08C 17/00; G08C 2201/20; G08C 2201/62; G08C 2201/50; G08C 23/04; G08C 2201/31; G08C 2201/21; G08C 2201/92; G08C 2201/93; G08C 19/28; G08C 2201/30; G08C 2201/51; G08C 2201/61; G08C 25/02; E06B 9/70; E06B 9/82; G05B 19/0428; G05B 2219/24145; G05B 2219/2628; G05B 15/02; G05B 1/00; G05B 2219/2642; G07B 15/04; G07B 15/02; B60R 2325/205; B60R 25/00; B60R 25/102; B60R 25/305; B60R 25/245; G06K 2209/15; G06K 9/4604; G06Q 10/00; G06Q 10/0639; G06Q 20/3276; G06Q 30/0284; G06Q 90/00; G08G 1/017; G08G 1/04; G08G 1/042; G08G 1/14; H04N 7/186; H04W 4/021; H04W 4/023; H04W 4/30; H04W 64/00; H04W 8/005; Y04S 10/54; H04L 12/2829; B66B 13/26; E04H 6/02; E04H 6/42; G01S 17/04; G01S 19/41; G01S 19/51; H01Q 1/3241; H04B 5/0062; H04B 5/02

See application file for complete search history.

(56) References Cited

U.S. PATENT DOCUMENTS

| | | | |
|---|---|---|---|
| 5,793,300 | A | 8/1998 | Suman et al. |
| 5,900,806 | A | 5/1999 | Issa et al. |
| 6,091,217 | A | 7/2000 | Parsadayan |
| 6,091,330 | A | 7/2000 | Swan et al. |
| 6,271,765 | B1 | 8/2001 | King et al. |
| 6,400,956 | B1 | 6/2002 | Richton |
| 6,469,464 | B1 | 10/2002 | McCall |
| 6,476,732 | B1 | 11/2002 | Stephan |
| 6,526,335 | B1 | 2/2003 | Treyz et al. |
| 6,563,278 | B2 | 5/2003 | Roman |
| 6,615,132 | B1 | 9/2003 | Nagasaka et al. |
| 6,711,474 | B1 | 3/2004 | Treys et al. |
| 6,911,898 | B2 | 6/2005 | Chung |
| 6,975,203 | B2 | 12/2005 | Brookbank et al. |
| 7,039,391 | B2 | 5/2006 | Rezvani et al. |
| 7,046,119 | B2 | 5/2006 | Ghabra et al. |
| 7,068,163 | B2 | 6/2006 | Sari et al. |
| 7,071,813 | B2 | 7/2006 | Fitzgibbon |
| 7,088,265 | B2 | 8/2006 | Tsui et al. |
| 7,127,847 | B2 | 10/2006 | Fitzgibbon et al. |
| 7,170,248 | B2 | 1/2007 | Tsui et al. |
| 7,170,426 | B2 * | 1/2007 | Tsui .................. G07C 9/00309 340/539.13 |
| 7,183,933 | B2 | 2/2007 | Dzurko et al. |
| 7,205,908 | B2 | 4/2007 | Tsui et al. |
| 7,310,043 | B2 | 12/2007 | Mamaloukas |
| 7,327,107 | B2 | 2/2008 | Mullet et al. |
| 7,327,108 | B2 | 2/2008 | Mullet et al. |
| 7,332,999 | B2 | 2/2008 | Fitzgibbon |
| 7,342,368 | B2 | 3/2008 | Roman |
| 7,358,480 | B2 | 4/2008 | Mullet et al. |
| 7,498,936 | B2 | 3/2009 | Maeng |
| 7,545,833 | B2 | 6/2009 | Chau et al. |
| 7,602,283 | B2 | 10/2009 | John |
| 7,609,146 | B2 | 10/2009 | Tang et al. |
| 7,635,960 | B2 | 12/2009 | Mullet et al. |
| 7,710,284 | B2 | 5/2010 | Dzurko et al. |
| 7,733,218 | B2 | 6/2010 | Drago et al. |
| 7,881,733 | B2 | 2/2011 | Staton et al. |
| 7,911,358 | B2 | 3/2011 | Bos et al. |
| 7,973,678 | B2 | 7/2011 | Petricoin, Jr. et al. |
| 8,049,595 | B2 | 11/2011 | Olson et al. |
| 8,058,970 | B2 | 11/2011 | Mullet et al. |
| 8,068,006 | B2 | 11/2011 | Martin |
| 8,111,997 | B2 | 2/2012 | Butler |
| 8,115,616 | B2 | 2/2012 | Gonzaga |
| 8,179,229 | B2 | 5/2012 | Mullet |
| 8,244,448 | B2 | 8/2012 | Newman |
| 8,279,040 | B2 | 10/2012 | Laird |
| 8,291,642 | B2 | 10/2012 | Jankovsky |
| 8,299,893 | B2 | 10/2012 | Mullet |
| 8,330,572 | B2 | 12/2012 | Rodriguez et al. |
| 8,400,264 | B2 | 3/2013 | Mullet et al. |
| 8,531,266 | B2 | 9/2013 | Shearer et al. |
| 8,577,392 | B1 | 11/2013 | Pai et al. |
| 8,643,467 | B2 | 2/2014 | Chutorash et al. |
| 8,648,695 | B2 | 2/2014 | Fitzgibbon et al. |
| 8,653,962 | B2 | 2/2014 | Maeng |
| 8,710,978 | B2 | 4/2014 | Stählin et al. |
| 8,878,646 | B2 | 11/2014 | Chutorash et al. |
| 8,922,356 | B2 | 12/2014 | Lambert et al. |
| 8,994,496 | B2 | 3/2015 | Freese et al. |
| 9,007,168 | B2 | 4/2015 | Bos et al. |
| 9,129,502 | B2 | 9/2015 | Naim et al. |
| 9,169,684 | B2 | 10/2015 | Fan et al. |
| 9,189,952 | B2 | 11/2015 | Chutorash et al. |
| 9,208,629 | B2 | 12/2015 | Saladin et al. |
| 9,230,378 | B2 | 1/2016 | Chutorash et al. |
| 9,264,673 | B2 | 2/2016 | Chundrlik, Jr. et al. |
| 9,326,100 | B2 | 4/2016 | Guo et al. |

(56) References Cited

U.S. PATENT DOCUMENTS

| | | | |
|---|---|---|---|
| 9,412,264 B2 | 8/2016 | Geerlings et al. | |
| 9,430,939 B2 | 8/2016 | Shearer et al. | |
| 9,507,335 B2 | 11/2016 | Wilder et al. | |
| 9,509,962 B2 | 11/2016 | Chundrlik, Jr. et al. | |
| 9,539,930 B2 | 1/2017 | Geerlings | |
| 9,542,834 B2 | 1/2017 | Geerlings et al. | |
| 9,551,781 B2 | 1/2017 | Baxley et al. | |
| 9,555,814 B2 | 1/2017 | Neubecker et al. | |
| 9,556,812 B2 | 1/2017 | Ozkan | |
| 9,581,456 B2 | 2/2017 | Liao et al. | |
| 9,600,950 B2 | 3/2017 | Chutorash et al. | |
| 9,620,005 B2 | 4/2017 | Geerlings et al. | |
| 9,656,691 B2 | 5/2017 | Heimberger et al. | |
| 9,672,670 B2 | 6/2017 | Menkveld | |
| 9,879,466 B1 | 1/2018 | Yu | |
| 2002/0002443 A1 | 1/2002 | Ames et al. | |
| 2002/0170685 A1 | 11/2002 | Weik, III et al. | |
| 2003/0102836 A1 | 6/2003 | McCall | |
| 2003/0174045 A1 | 9/2003 | Zhang | |
| 2003/0197594 A1 | 10/2003 | Olson et al. | |
| 2003/0197595 A1 | 10/2003 | Olson et al. | |
| 2003/0216139 A1 | 11/2003 | Olson et al. | |
| 2005/0140321 A1 | 6/2005 | Wojciak, Jr. | |
| 2005/0206497 A1 | 9/2005 | Tsui et al. | |
| 2005/0212681 A1 | 9/2005 | Dzurko et al. | |
| 2006/0071155 A1 | 4/2006 | Chen | |
| 2006/0077035 A1* | 4/2006 | Mamaloukas | G07C 9/00309 340/5.61 |
| 2006/0157206 A1 | 7/2006 | Weik, III et al. | |
| 2006/0158344 A1 | 7/2006 | Bambini et al. | |
| 2006/0220834 A1 | 10/2006 | Maeng | |
| 2007/0046232 A1 | 3/2007 | Mullet et al. | |
| 2007/0085067 A1 | 4/2007 | Lewis | |
| 2007/0149124 A1* | 6/2007 | Onozawa | H04B 5/02 455/41.2 |
| 2007/0188120 A1 | 8/2007 | Mullet et al. | |
| 2008/0061926 A1 | 3/2008 | Strait | |
| 2008/0164973 A1* | 7/2008 | Mamaloukas | G07C 9/00309 340/5.7 |
| 2008/0224819 A1 | 9/2008 | Callentine | |
| 2009/0189779 A1 | 7/2009 | Gao | |
| 2009/0269635 A1 | 10/2009 | Muramatsu | |
| 2010/0085145 A1 | 4/2010 | Laird | |
| 2010/0127882 A1 | 5/2010 | Sitarski | |
| 2010/0265034 A1* | 10/2010 | Cap | B60R 25/245 340/5.71 |
| 2011/0032073 A1 | 2/2011 | Mullet et al. | |
| 2011/0032115 A1 | 2/2011 | Kwiecinski et al. | |
| 2011/0193700 A1 | 8/2011 | Fitzgibbon et al. | |
| 2012/0255231 A1 | 10/2012 | Jenkins et al. | |
| 2012/0265874 A1 | 10/2012 | Hoh et al. | |
| 2013/0033359 A1 | 2/2013 | Ji et al. | |
| 2013/0042530 A1 | 2/2013 | Leivenzon et al. | |
| 2013/0086841 A1 | 4/2013 | Luper et al. | |
| 2013/0117078 A1 | 5/2013 | Weik, III et al. | |
| 2013/0147600 A1 | 6/2013 | Murray | |
| 2013/0147616 A1 | 6/2013 | Lambert et al. | |
| 2014/0118111 A1 | 5/2014 | Saladin et al. | |
| 2014/0125499 A1 | 5/2014 | Cate et al. | |
| 2014/0167961 A1 | 6/2014 | Finlow-Bates | |
| 2014/0266593 A1 | 9/2014 | Nye et al. | |
| 2014/0305599 A1 | 10/2014 | Pimenov | |
| 2014/0320263 A1 | 10/2014 | Fan et al. | |
| 2015/0002262 A1 | 1/2015 | Geerlings et al. | |
| 2015/0084750 A1 | 3/2015 | Fitzgibbon | |
| 2015/0084779 A1 | 3/2015 | Saladin et al. | |
| 2015/0137941 A1 | 5/2015 | Bauer et al. | |
| 2015/0148983 A1 | 5/2015 | Fitzgibbon | |
| 2015/0235495 A1 | 8/2015 | Hall et al. | |
| 2015/0266356 A1 | 9/2015 | Fischer et al. | |
| 2015/0302672 A1 | 10/2015 | Kalsi et al. | |
| 2015/0302735 A1 | 10/2015 | Geerlings et al. | |
| 2015/0302736 A1 | 10/2015 | Geerlings et al. | |
| 2015/0302737 A1 | 10/2015 | Geerlings et al. | |
| 2015/0348344 A1 | 12/2015 | Rettig et al. | |
| 2016/0018798 A1 | 1/2016 | Jiang et al. | |
| 2016/0053699 A1 | 2/2016 | Ozkan | |
| 2016/0055742 A1 | 2/2016 | Wang et al. | |
| 2016/0101736 A1 | 4/2016 | Geerlings et al. | |
| 2016/0104364 A1 | 4/2016 | Brooks et al. | |
| 2016/0117879 A1 | 4/2016 | Chutorash et al. | |
| 2016/0130853 A1 | 5/2016 | Tehranchi | |
| 2016/0148451 A1 | 5/2016 | Menkveld | |
| 2016/0300415 A1 | 10/2016 | Deneen et al. | |
| 2016/0312517 A1 | 10/2016 | Elie et al. | |
| 2016/0314362 A1 | 10/2016 | Elie et al. | |
| 2016/0321914 A1 | 11/2016 | Geerlings et al. | |
| 2016/0343233 A1 | 11/2016 | Wassef et al. | |
| 2016/0375898 A1 | 12/2016 | Breuel et al. | |
| 2017/0030737 A1 | 2/2017 | Elie et al. | |
| 2017/0034485 A1 | 2/2017 | Scalisi | |
| 2017/0106874 A1 | 4/2017 | Neubecker et al. | |
| 2017/0108873 A1 | 4/2017 | Tanaka et al. | |
| 2017/0114585 A1 | 4/2017 | Ozkan | |
| 2017/0138111 A1 | 5/2017 | Lietz et al. | |
| 2017/0140646 A1 | 5/2017 | Lu et al. | |
| 2017/0147887 A1 | 5/2017 | Be et al. | |
| 2017/0154482 A1 | 6/2017 | Osborne | |
| 2017/0175433 A1 | 6/2017 | Kang et al. | |
| 2017/0289754 A1* | 10/2017 | Anderson | H04W 4/029 |
| 2018/0030764 A1 | 2/2018 | Shaw et al. | |
| 2018/0184465 A1* | 6/2018 | Chatterjee | H04L 41/0618 |
| 2018/0194344 A1 | 7/2018 | Wang et al. | |
| 2018/0216389 A1 | 8/2018 | Tsui et al. | |
| 2018/0247475 A1 | 8/2018 | Archbold | |
| 2019/0048643 A1* | 2/2019 | Lickfelt | E05F 15/73 |
| 2019/0048644 A1* | 2/2019 | Lickfelt | E05F 15/77 |

OTHER PUBLICATIONS

Notice of Allowance of U.S. Appl. No. 15/810,609 dated Jul. 11, 2018, 30 pages.

Office Action of U.S. Appl. No. 15/713,782 dated Sep. 7, 2018, 47 pages.

Office Action of U.S. Appl. No. 15/791,063 dated Oct. 30, 2018, 71 pages.

Office Action of U.S. Appl. No. 15/803,293 dated Mar. 22, 2018, 48 pages.

Office Action of U.S. Appl. No. 15/803,293 dated Nov. 29, 2018, 52 pages.

Office Action of U.S. Appl. No. 15/696,211 dated Jan. 2, 2019, 48 pages.

Office Action of U.S. Appl. No. 15/884,730 dated Jan. 10, 2019, 35 pages.

Notice of Allowance of U.S. Appl. No. 15/791,063 dated Mar. 29, 2019, 21 pages.

Office Action of U.S. Appl. No. 15/803,293 dated Mar. 29, 2019, 57 pages.

Office Action of U.S. Appl. No. 15/696,211 dated May 31, 2019, 23 pages.

Office Action of U.S. Appl. No. 15/878,893 dated Jun. 7, 2019, 32 pages.

Office Action of U.S. Appl. No. 15/884,730 dated Jun. 28, 2019, 22 pages.

Notice of Allowance of U.S. Appl. No. 15/884,730 dated Oct. 22, 2019, 8 pages.

* cited by examiner

SYSTEM AND METHOD FOR DETERMINING AT LEAST ONE ZONE ASSOCIATED WITH AUTOMATIC CONTROL OF A BARRIER

This application claims priority to U.S. Provisional Application Ser. No. 62/542,755 filed on Aug. 8, 2017, which is expressly incorporated herein by reference.

BACKGROUND

In many cases, movable barriers such as garage doors may need to be manually operated by a driver of a vehicle as the vehicle is arriving towards a barrier or departing away from the barrier. In some cases when the vehicle is arriving towards the barrier the driver has to time when to manually actuate the opening of the barrier. As it may take a significant time to move the barrier from one state to another (e.g., closed to open), the driver may be forced to wait until the barrier is fully opened before parking the vehicle. In particular, the vehicle may arrive in front of the barrier with it having only partially completing its opening cycle. Consequently, the vehicle driver must completely stop the vehicle and wait for the movable barrier to completely open thereby wasting time and fuel/energy.

In some cases, as the vehicle departs away from the barrier, the driver may not be fully aware that the barrier has fully closed before driving away from the barrier. In such cases, the driver may notice that the barrier is being closed, however, may not wait to see if the barrier fully traverses to a fully closed state. Consequently, there is a risk that unbeknownst to the driver the barrier may not fully close based on the presence of a physical obstruction or a mechanical or environmental condition.

BRIEF DESCRIPTION

According to one aspect, a computer-implemented method for determining at least one zone associated with automatic control of a barrier that includes determining a traveling direction of a vehicle with respect to the barrier. The method also includes determining at least one dynamic status zone associated with the barrier based on the traveling direction of the vehicle. The at least one dynamic status zone is modified based on maximum distance at which communication signals are exchanged between the vehicle and a barrier controller associated with the barrier. The method additionally includes determining at least one barrier control zone associated with the barrier based on the at least one dynamic status zone. The at least one barrier control zone is provided at a location that is based on a location of the at least one dynamic status zone.

According to another aspect, a system for determining at least one zone associated with automatic control of a barrier that includes a memory storing instructions when executed by a processor that cause the processor to determine a traveling direction of a vehicle with respect to the barrier. The instructions also cause the processor to determine at least one dynamic status zone associated with the barrier based on the traveling direction of the vehicle. The at least one dynamic status zone is modified based on maximum distance at which communication signals are exchanged between the vehicle and a barrier controller associated with the barrier. The instructions additionally cause the processor to determine at least one barrier control zone associated with the barrier based on the at least one dynamic status zone. The at least one barrier control zone is provided at a location that is based on a location of the at least one dynamic status zone.

According to still another aspect, a computer readable storage medium storing instructions that when executed by a computer, which includes at least a processor, causes the computer to perform a method that includes determining a traveling direction of a vehicle with respect to a barrier. The method also includes determining at least one dynamic status zone associated with the barrier based on the traveling direction of the vehicle. The at least one dynamic status zone is modified based on maximum distance at which communication signals are exchanged between the vehicle and a barrier controller associated with the barrier. The instructions additionally include determining at least one barrier control zone associated with the barrier based on the at least one dynamic status zone. The at least one barrier control zone is provided at a location that is based on a location of the at least one dynamic status zone.

DETAILED DESCRIPTION

Figure 1:
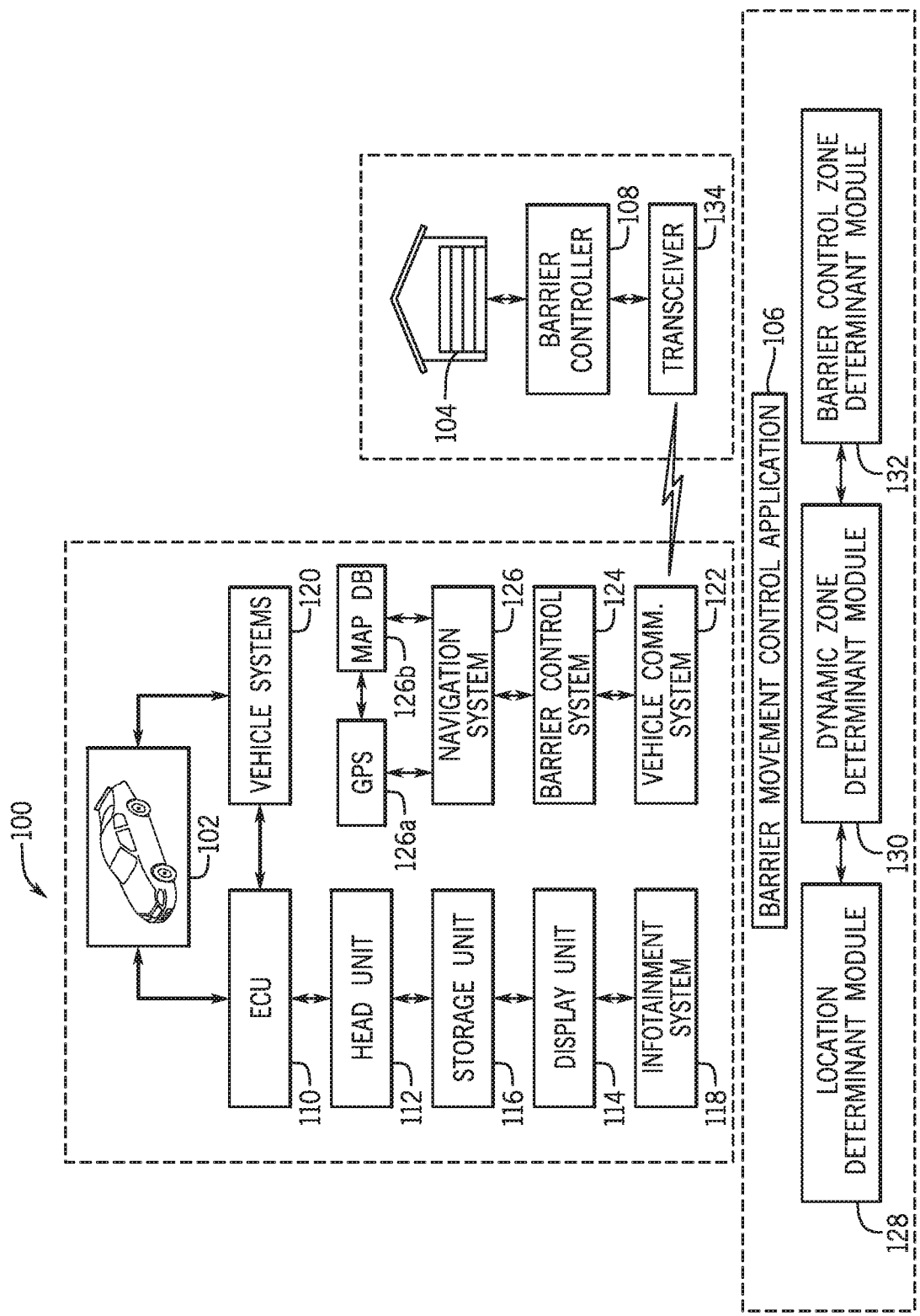
FIG. 1 is a schematic view of an operating environment for implementing systems and methods within a vehicle for determining at least one zone associated with automatic control of a barrier according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods within a vehicle 102 for determining at least one zone associated with automatic control of a barrier 104 according to an exemplary embodiment. The components of the environment 100, as well as the components of other systems, hardware architectures, and software architectures discussed herein, can be combined, omitted, or organized into different architectures for various embodiments.

Generally, the environment includes a barrier movement control application (barrier control application) 106 that is executed to determine at least one zone associated with automatic control of the barrier 104 that may be applied by the application 106 for the vehicle 102 to send one or more types of signals to a barrier controller 108 based on one or more factors. The at least one zone may include at least one dynamic status zone and at least one barrier control zone that may be utilized for the vehicle 102 to send one or more barrier status request signals that may be used to determine a current state of the barrier 104 and one or more barrier control signals to send a command to traverse the barrier 104 to an opened state (e.g., to fully open the barrier 104) and/or traverse the barrier 104 to a closed state (e.g., to fully close the barrier 104).

In the illustrated embodiment of FIG. 1, the vehicle 102 may include a plurality of components that may be operably connected for computing communication via a bus (not shown) (e.g., a Controller Area Network (CAN) or a Local Interconnect Network (LIN) protocol bus), an input/output interface (I/O interface) and/or other wired and wireless technologies. The plurality of components of the vehicle 102 may generally include an electronic control unit (ECU) 110, a head unit 112, a display unit 114, a storage unit 116, and an infotainment system 118. Additionally, the plurality of components of the vehicle 102 may also include a plurality of vehicle systems 120 in addition to the infotainment system 118.

In an exemplary embodiment, the ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources, of the environment 100. In one embodiment, the ECU 110 may execute one or more operating systems, applications, and/or interfaces that are associated to the vehicle 102 and/or the plurality of vehicle systems 120. The ECU 110 may also be operably connected for computer communication to the head unit 112. The head unit 112 may include internal processing memory, an interface circuit, and bus lines (components of the head unit not shown) for transferring data, sending commands, and communicating with the components of the vehicle 102. In one or more embodiments, the ECU 110 may execute one or more operating systems, applications, and/or interfaces that are associated to the vehicle 102 and/or the plurality of vehicle systems 120.

In one embodiment, the head unit 112 may be connected to the infotainment system 118. The infotainment system 118 may act as an information hub of the vehicle 102 that presents and delivers information to the user (e.g., audio, video, HVAC, barrier controls, etc.). In one embodiment, the infotainment system 118 may be operably connected to a barrier control system 124 of the vehicle 102 to send and receive data signals that may be utilized to remotely control the barrier 104.

The display unit 114 may be disposed within a center stack area of the vehicle 102. Based on the operation of the infotainment system 118, the display unit 114 may display one or more vehicle human machine interfaces (vehicle HMI) to provide the driver of the vehicle 102 with various types of information and/or to receive one or more inputs from the driver of the vehicle 102. More specifically, the vehicle HMI may pertain to one or more operating systems, vehicle system interfaces, and application interfaces, including interfaces pertaining to the barrier control application 106. The vehicle HMI may present one or more user interfaces of the barrier control application 106 including a barrier configuration user interface (not shown) and a barrier status user interface (not shown).

As discussed below, the barrier status user interface may provide a user (e.g., driver of the vehicle 102) with a current state of the barrier 104 as the vehicle 102 is arriving towards the barrier 104, and departing away from the barrier 104 based on a determined location(s) of one or more zones that may be dynamically provided based on a maximization of reliable communication between the vehicle 102 and a barrier controller 108 operably controlling the barrier 104.

In an exemplary embodiment, the vehicle 102 may additionally include a storage unit 116. The storage unit 116 may store one or more operating systems, applications, associated operating system data, application data, vehicle system and subsystem user interface data, and the like that are executed by the ECU 110, the head unit 112, and the plurality of vehicle systems 120. The storage unit 116 may include one or more barrier profiles that are respectively associated to one or more barriers based on user inputs. As discussed in more detail below, the barrier profile(s) may be created, populated and/or updated by the barrier control application 106.

In one embodiment, the barrier profile(s) may include details that are associated with the barrier 104 as identified by the user. The details may include a name assigned to the barrier 104 by the user (e.g., primary garage door), a geo-location associated with the barrier 104 (e.g., GPS, DGPS coordinates of the location of the barrier 104), and a plurality of global positioning coordinates associated with respective boundaries of one or more zones associated with the barrier 104 that are determined by the application 106. As discussed in more detail below, the barrier profile(s) may be created, populated, updated, and/or evaluated to retrieve data based on the execution of the barrier control application 106.

In addition to the infotainment system 118, the plurality of vehicle systems 120 may include, but may not be limited to, a vehicle communication system 122, the barrier control system 124, and a navigation system 126. In one embodiment, the vehicle communication system 122 may include one or more transceivers that are capable of providing wireless computer communications utilizing various protocols to be utilized to send/receive electronic signals internally to components and systems within the vehicle 102 and to external devices including a transceiver 134 operably connected to a barrier controller 108 associated with the barrier 104.

In one embodiment, the barrier control system 124 of the vehicle 102 may be utilized to provide manual or automatic commands to the vehicle communication system 122. In particular, the barrier control system 124 may utilize the vehicle communication system 122 to send the one or more barrier control signals to actuate movement of the barrier 104 to open or close the barrier 104 based on one or more user inputs. In one configuration, the barrier control system 124 may be included as part of a HOMELINK® trainable garage door opening device (or other embedded, integrated accessory of the vehicle 102) that is integrated within a ceiling panel (not shown) or rearview mirror (not shown) of the vehicle 102. In some configurations, the barrier control system 124 may include one or more input buttons (not shown) that may be inputted by the user to actuate movement of the barrier 104.

The vehicle communication system 122 may be capable of providing wired or wireless computer communications utilizing various protocols to send/receive non-transitory signals internally to the plurality of components of the vehicle 102 and/or externally to external devices. Generally, these protocols include a wireless system (e.g., IEEE 802.11 (Wi-Fi), IEEE 802.15.1 (Bluetooth)), a near field communication system (NFC) (e.g., ISO 13157), a local area network (LAN), and/or a point-to-point system. More particularly, the vehicle communication system 122 may be utilized by the barrier control system 124 to send (i.e., transmit) one or more radio frequency (RF) signals in one or more frequencies and/or radio bands to communicate commands and data to the barrier controller 108 through the transceiver 134.

In one embodiment, the vehicle communication system 122 may communicate the one or more command signals that include but are not limited to, one or more barrier status request signals and/or one or more barrier control signals to the transceiver 134 based on the location of the vehicle 102 with respect to the one or more zones as determined by the application 106. In particular, the barrier control system 124 may utilize the vehicle communication system 122 to send the one or more status request signals to be evaluated by the barrier controller 108 based on the entrance and/or exit of the vehicle 102 from one or more dynamic status zones as determined by the application 106. Upon evaluating the barrier status request signal(s), the barrier controller 108 may determine the current state of the barrier 104 as the opened state, the partially opened state, or the closed state. The barrier control system 124 may further utilize the vehicle communication system 122 to send the one or more barrier control signals to remotely control movement of the barrier 104 (e.g., actuate movement of the barrier 104 to open or close) based on the entrance and/or exit of the vehicle 102 to and from one or more barrier control zones as determined by the application 106 and based on the determination of the current state of the barrier 104 as determined and provided by the barrier controller 108.

As discussed in more detail below, the vehicle communication system 122 may be additionally utilized to receive one or more response data signals sent from the transceiver 134 including, but not limited to, one or more current state data signals that are initiated by the barrier controller 108 to be interpreted by the barrier control application 106 and the barrier control system 124. The barrier control signal(s) may be sent by the barrier control system 124 to open or close the barrier 104 based on the evaluation of the at least one current state data signal to determine the current state of the barrier 104. Additionally, the barrier control signal(s) may be sent by the barrier control system 124 to open or close the barrier 104 based on the determination as to the arrival of the vehicle 102 towards the barrier 104 and/or the departure of the vehicle 102 away from the barrier 104.

In an exemplary embodiment, the navigation system 126 may be connected to the head unit 112, the infotainment system 118, and the display unit 114 to provide a map user interface (not shown) to the driver of the vehicle 102. The navigation system 126 may include a global position system 126a (GPS) that may also be used to localize (i.e., determine the GPS or DGPS coordinates) the vehicle 102. The navigation system 126 may include its own processor and memory that communicate with the GPS 126a to determine and provide route guidance to the driver of the vehicle 102.

In one or more embodiments, the navigation system 126 may include and/or connect to and access a map database 126b to present one or more details and graphics on the map user interface through the display unit 114. The map database 126b may include geographical maps of one or more locations (e.g., countries, regions, cities) in which the vehicle 102 may be driven. The map database 126b may also include locational data that pertains to the barrier 104. In one embodiment, the barrier control application 106 may utilize the navigation system 126 to localize the barrier 104 and to determine a plurality of global positioning coordinates associated with one or more areas that are located within the surrounding area of the barrier 104. The plurality of global positioning coordinates associated with the one or more areas may constitute boundaries of the one or more zones associated with the barrier 104.

With particular reference to the barrier 104, in one or more embodiments, the barrier 104 may include a garage door, a gate (e.g., one or more gate doorways), a door (e.g., a residential door), etc. The barrier 104 may be connected to and controlled by the barrier controller 108. The barrier controller 108 may include internal processing memory, an interface circuit, and bus lines for transferring data, sending commands, and communicating with the components associated with and/or connected to the barrier 104. In one embodiment, the barrier controller 108 may be connected to a remote control (e.g., garage door remote) (not shown) and an interface device (e.g., wall inputs, numeric key pad) (not shown) that may be used by the user to provide one or more inputs to control movement of the barrier 104.

As discussed above, the barrier controller 108 may be operably connected to the transceiver 134. The barrier controller 108 may be configured to control operation of the transceiver 134 to receive the one or more command signals from the vehicle communication system 122. Additionally, the barrier controller 108 may be configured to control operation of the transceiver 134 to send (e.g., transmit) one or more response signals to the vehicle communication system 122. In particular, the barrier controller 108 may evaluate the one or more data signals received by the transceiver 134 and may instruct the transceiver 134 to send the one or more response data signals.

II. The Barrier Movement Control Application

The components of the barrier control application 106 will now be described according to an exemplary embodiment and with reference to FIG. 1. In an exemplary embodiment, the barrier control application 106 may be stored on the storage unit 116 of the vehicle 102. In alternate embodiments, the barrier control application 106 may be stored on an external server infrastructure (not shown) and may be accessed by the vehicle communication system 122 to be executed by the ECU 110 and/or the head unit 112 of the vehicle 102. In an exemplary embodiment, the barrier control application 106 may include a location determinant module 128, a dynamic zone determinant module (dynamic zone module) 130, and a barrier control zone determinant module (control zone module) 132. It is to be appreciated that the barrier control application 106 may include additional modules and/or sub-modules that are configured to execute one or more functions of the application 106.

As will be described in more detail below, the location determinant module 128 may be utilized to determine the location of the vehicle 102 with respect to the (location of) the barrier 104. The dynamic zone module 130 may determine dynamic status zones that include one or more dynamic arrival status zones and one or more dynamic departure status zones. The dynamic arrival status zone(s) may be utilized to send one or more status request signals between the vehicle communication system 122 and the transceiver 134 to determine the state of the barrier 104 at an earliest possible point (e.g., instance, location, time) during the arrival of the vehicle 102 towards the barrier 104. The dynamic departure status zone(s) may be utilized to send one or more status request signals between the vehicle communication system 122 and the transceiver 134 to determine the state of the barrier 104 at a latest possible point (e.g., instance, location, time) during the departure of the vehicle 102 away from the barrier 104. As discussed below, the dynamic zone module 130 may determine the earliest possible point and the latest point based on the ability of the vehicle communication system 122 and the transceiver 134 to successfully send and receive RF signals between one another. The dynamic arrival status zone(s) and the dynamic departure status zone(s) may be modified based on a maximum distance at which communication signals are exchanged between the vehicle 102 and the barrier controller 108 associated with the barrier 104.

In an exemplary embodiment, the control zone module 132 may determine barrier control zones that may include a barrier opening zone and a barrier closing zone. The barrier opening zone may be utilized to send one or more barrier control signals to traverse the barrier 104 to the opened state based on the arrival of the vehicle 102 towards the barrier 104. The barrier closing zone may be utilized to send one or more barrier control signals to traverse the barrier 104 to the closed state based on the departure of the vehicle 102 away from the barrier 104.

As discussed, the barrier control system 124 of the vehicle 102 may utilize the dynamic barrier status zones to determine the current state of the barrier 104 based on the entrance or exit of the vehicle 102 to/from the dynamic barrier status zones. Additionally, the barrier control system 124 may utilize the barrier control zones to remotely control the movement of the barrier 104 to traverse the barrier 104 to the opened state, the closed state, or the partially opened state based on the entrance of the vehicle 102 to the barrier opening zone or the exit of the vehicle 102 from the barrier closing zone.

As discussed, the user may create the barrier profile associated with the barrier 104. In one embodiment, upon creation of the barrier profile, the location determinant module 128 may communicate with the navigation system 126 of the vehicle 102 to determine the geo-location associated with the barrier 104. As discussed below, the geo-location associated with the barrier 104 may be used to determine if the vehicle 102 is being driven and is arriving towards the barrier 104 (i.e., the geo-location associated with the barrier 104). The geo-location associated with the barrier 104 may also be used to determine if the vehicle 102 is being driven and is departing away from the barrier 104 (i.e., the geo-location associated with the barrier 104).

In one embodiment, the user may input a user interface icon (not shown) via the vehicle HMI presented on the display unit 114 to create the barrier profile associated with the barrier 104. For example, the driver of the vehicle 102 may wish to create the barrier profile that is associated to the barrier 104 (e.g., garage door) located at the driver's home to enable the application 106 to communicate with the barrier controller 108 (e.g., garage door opener) associated with the barrier 104. Once the user selects the respective user interface icon and inputs the name assigned to the barrier 104 per the user's choosing, the barrier control application 106 may store the barrier profile on the storage unit 116 of the vehicle 102. Upon storing the barrier profile on the storage unit 116, a respective indication may be communicated to the location determinant module 128 indicating that the user has setup the barrier profile associated with the barrier 104.

In an exemplary embodiment, upon receiving the indication that the user has setup the barrier profile associated with the barrier 104, the location determinant module 128 may present a barrier location determination user interface (not shown) to the user. The barrier location determination user interface may be utilized by the user to actuate the determination of the geo-location of the barrier 104 when the vehicle 102 is located within the area enclosed by the barrier 104. More specifically, the barrier location determination user interface may include a user interface object(s) that may be inputted by the user to indicate that the vehicle 102 is within the area enclosed by the barrier 104 to enable the dynamic zone module 130 to determine the geo-location of the barrier 104.

In one embodiment, the location determinant module 128 may communicate with the navigation system 126 of the vehicle 102 to determine the geo-location of the barrier 104. The navigation system 126 may access the GPS 126a to determine locational coordinates associated with the location of the vehicle 102. In one embodiment, the navigation system 126 may further access the map database 130a to determine if a highlighted location that may include a dwelling/building that includes the barrier 104 is located within a predetermined proximity of the vehicle 102 (i.e., of the locational coordinates associated with the location of the vehicle 102 as determined by the GPS 126a). The highlighted location may be indicative of a home location saved by the user via the map user interface, a point of interest presented on the map interface, and/or a physical address that is included within the map database 130a.

In one embodiment, when the map database 130a communicates that the highlighted location is located within the predetermined proximity of the vehicle 102, the location determinant module 128 may ask the user (via the barrier location determination user interface) if the user wishes to interpret the highlighted location as the geo-location associated with the barrier 104. If the user does wish to interpret the highlighted location as the geo-location associated with the barrier 104, the location determinant module 128 may access the barrier profile and populate the locational coordinates associated with the highlighted location as the geo-location associated with the barrier 104.

In an additional embodiment, the user may utilize the map user interface of the navigation system 126 to input a saved location that may be utilized by the application 106 as the location of the barrier 104. For example, the user may input a home location as a saved location on the map user interface. The user may additionally utilize the barrier configuration user interface to input the saved location as the location of the barrier 104. The location determinant module 128 may communicate with the navigation system 126 to determine the geo-location of the barrier 104 based on the saved location. The location determinant module 128 may further access the barrier profile stored on the storage unit 116 and may populate the locational coordinates associated with the saved location as the geo-location associated with the barrier 104.

As discussed below, the stored geo-location may be used by the application 106 to determine if the vehicle 102 is located within an area within a predetermined vicinity of the barrier 104, if the vehicle 102 is arriving towards the barrier 104, or if the vehicle 102 is departing away from the barrier 104. Additionally, the stored geo-location may be used by the application 106 when determining the one or more dynamic zones and the one or more barrier control zones associated with the barrier 104 based on the location and/or a traveling direction of the vehicle 102 with respect to the barrier 104.

In an exemplary embodiment, the location determinant module 128 may also be utilized to determine the location and/or the traveling direction of the vehicle 102 with respect to the barrier 104. In particular, the location determinant module 128 may determine if the vehicle 102 is within the predetermined vicinity of the barrier 104 (e.g., 10 m from the barrier), the vehicle 102 is arriving toward the barrier 104 (e.g., vehicle 102 is being driven to the home where the barrier 104 is located), or the vehicle 102 is departing from the barrier 104 (e.g., vehicle 102 is being driven away from the home where the barrier 104 is located).

In one embodiment, the location determinant module 128 may communicate with the navigation system 126 of the vehicle 102 to determine the locational coordinates associated with the (location of the) vehicle 102. In particular, as the vehicle 102 is being driven the location determinant module 128 may communicate with the navigation system 126 to continually determine the locational coordinates associated with the vehicle 102 as provided by the GPS 126a. The location determinant module 128 may also access the barrier profile stored on the storage unit 116 to retrieve the geo-location associated with the barrier 104. Upon retrieving the geo-location associated with the barrier 104, the location determinant module 128 may communicate with the navigation system 126 to determine if the vehicle 102 is within a predetermined distance (e.g., within 0-200 yards) of the geo-location associated with the barrier 104. When the vehicle 102 is within the predetermined distance of the geo-location associated with the barrier 104, the location determinant module 128 may determine that the vehicle 102 is located within the predetermined vicinity of the barrier 104 and may communicate the location of the vehicle 102 to the other modules 130, 132 of the application 106 and/or the barrier control system 124 of the vehicle 102.

If the location determinant module 128 determines that the vehicle 102 is not located within the area enclosed by the barrier 104 or within the predetermined vicinity of the barrier 104, but that the vehicle 102 is located within the predetermined distance of the geo-location associated with the barrier 104, the location determinant module 128 may communicate with the navigation system 126 to utilize the GPS 126a and the map database 126b to evaluate if the vehicle 102 is being driven away from geo-location associated with the barrier 104. If the navigation system 126 determines that a distance between the locational coordinates of the vehicle 102, as provided by the GPS 126a and the geo-location of the barrier 104 are increasing, the navigation system 126 may communicate respective data to the location determinant module 128. The location determinant module 128 may determine that the vehicle 102 is departing from the barrier 104 and may communicate the location and traveling direction of the vehicle 102 to the other modules 130, 132 of the application 106 and/or the barrier control system 124 of the vehicle 102.

If the location determinant module 128 determines that the vehicle 102 is not located within the first predetermined distance of the geo-location associated with the barrier 104, the location determinant module 128 may communicate with the navigation system 126 to determine if the vehicle 102 is located within an additional predetermined distance (e.g., 1 mile) of the geo-location associated with the barrier 104 and if the vehicle 102 is arriving towards the barrier 104. In particular, if the navigation system 126 determines that the vehicle 102 is located within the additional predetermined distance of the barrier 104, the navigation system 126 may utilize the GPS 126a and the map database 126b to evaluate if the vehicle 102 is being driven towards the geo-location associated with the barrier 104. If the navigation system 126 determines that a distance between the locational coordinates of the vehicle 102, as provided by the GPS 126a and the geo-location of the barrier 104 is decreasing, the navigation system 126 may communicate respective data to the location determinant module 128. The location determinant module 128 may determine that the vehicle 102 is arriving towards the barrier 104 and may communicate the location and traveling direction of the vehicle 102 to the other modules 130, 132 of the application 106 and/or the barrier control system 124 of the vehicle 102.

With particular reference to the dynamic zone module 130, the module 130 of the barrier control application 106 may determine the one or more dynamic status zones associated with the barrier 104. The one or more dynamic zones may include plurality of areas located at a plurality of distances from the barrier 104. More specifically, the one or more dynamic status zones may be used to trigger the sending (e.g., transmission) of RF signals by the vehicle communication system 122 to the transceiver 134 operably connected to the barrier controller 108.

As discussed, the dynamic zone module 130 may determine the one or more dynamic arrival status zones. The one or more dynamic arrival zones may be dynamically provided (e.g., at dynamic distances from the barrier 104) in real-time during each instance in which the vehicle 102 is determined to arrive towards the barrier 104. Additionally, the dynamic zone module 130 may determine the one or more dynamic departure status zones. The one or more dynamic departure status zones may be dynamically provided (e.g., at dynamic distances from the barrier 104) in real-time during each instance in which the vehicle 102 is determined to depart away from the barrier 104. In one embodiment, upon determining the dynamic arrival status zone(s) and/or the dynamic departure status zone(s), the dynamic zone module 130 may communicate data associated with the determined location(s) of the dynamic status zones to the control zone module 132.

In an exemplary embodiment, during daily travel of the vehicle 102, as the vehicle 102 travels towards the barrier 104 and/or away from the barrier 104, the barrier control system 124 of the vehicle 102 may utilize the one or more dynamic status zones to send one or more current state data signals from the vehicle communication system 122 to the transceiver 134 operably connected to the barrier controller 108 to determine the state of the barrier 104 as the opened state, closed state, or the semi-opened state. In particular, when the vehicle 102 is determined to enter or exit one or more of the dynamic barrier status zones, the barrier control system 124 may utilize the vehicle communication system 122 to send (e.g., transmit) at least one status request signal to the barrier controller 108 to determine the state of the barrier 104. The current state of the barrier 104 may be utilized by the barrier control system 124 to send one or more barrier control signals to the barrier controller 108 to actuate the movement of the barrier 104 to traverse the barrier 104 to the opened state or the closed state based on current state of the barrier 104 as determined based on the traveling direction and entrance or exit of the vehicle 102 to and from the dynamic barrier status zones.

In an exemplary embodiment, the control zone module 132 of the barrier control application 106 may determine the one or more barrier control zones based on the dynamic locations of the one or more dynamic status zones. In particular, the control zone module 132 may determine location of the barrier opening zone(s) based on the determined location of the dynamic arrival status zone(s) as determined and communicated by the dynamic zone module 130. Similarly, the control zone module 132 may determine the location of the barrier closing zone(s) based on the determined location of the dynamic departure status zone(s)

as determined and communicated by the dynamic zone module 130. In other words, the control zone module 132 may determine the barrier opening zone(s) and the barrier closing zone(s) based on the dynamically changing location of the one or more dynamic status zones.

In particular, the barrier opening zone may be determined at one or more locations by the control zone module 132 based on the dynamically changing location(s) of the dynamic arrival status zone(s) as determined by the dynamic zone module 130. Additionally, the barrier closing zone may be determined at one or more locations by the control zone module 132 based on the dynamically changing location(s) of the dynamic departure status zone(s) as determined by the dynamic zone module 130. In one embodiment, the application 106 may utilize the barrier opening zone and the barrier closing zone to send at least one barrier control signal to the barrier controller 108 to actuate the movement of the barrier 104 to traverse the barrier 104 to the opened state or the closed state when the vehicle 102 is determined to enter or exit one or more of the respective zones.

Figure 2:
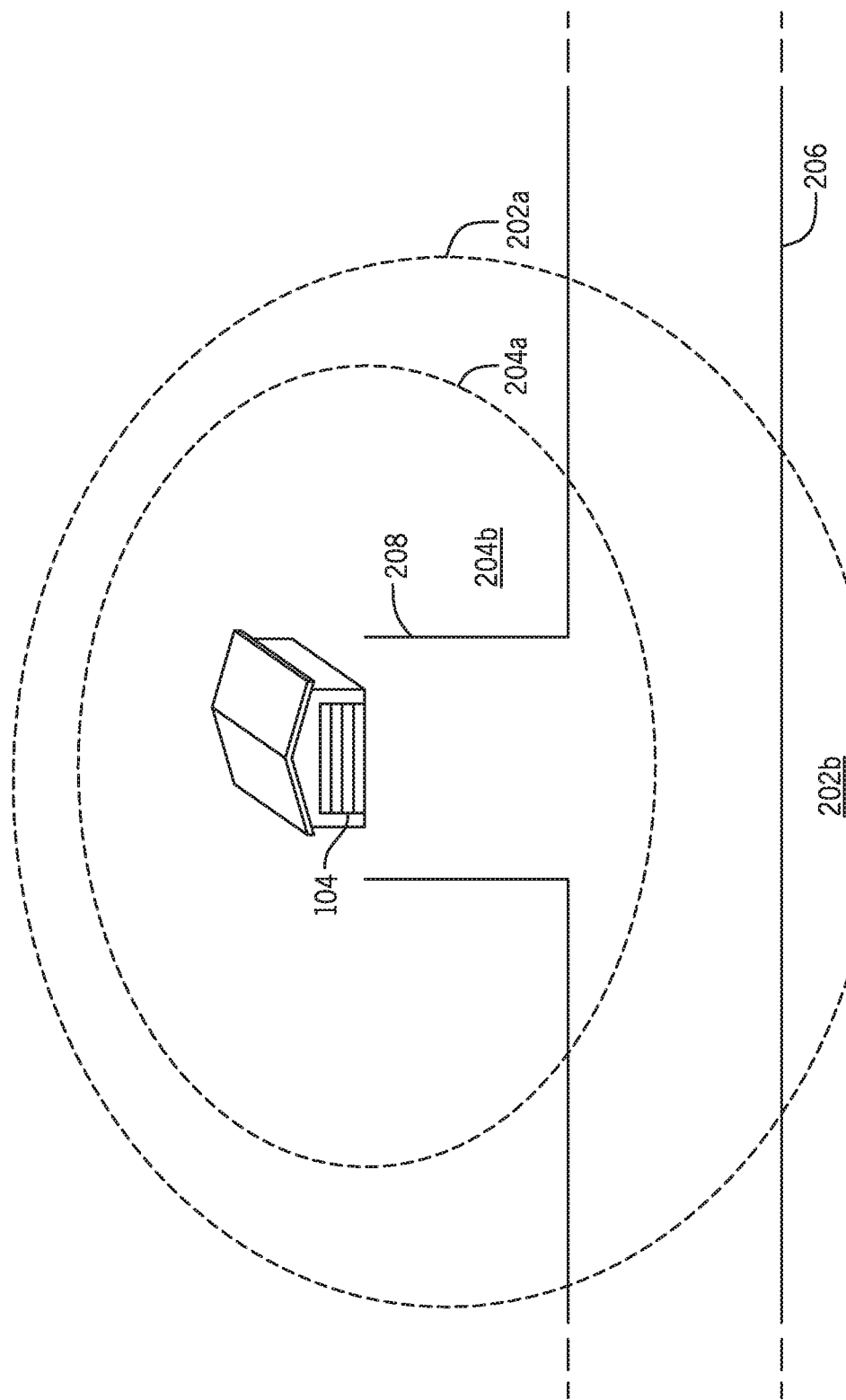
FIG. 2 is an illustrative example of the plurality of zones associated with the barrier that may be applied when the vehicle is determined to be arriving towards the barrier according to an exemplary embodiment.

III. Illustrative Embodiments Related to Determining at Least One Zone Associated with Automatic Control of a Barrier FIG. 2 is an illustrative example of the plurality of zones associated with the barrier 104 that may be applied when the vehicle 102 is determined to be arriving towards the barrier 104 according to an exemplary embodiment. As discussed, the location determinant module 128 may determine that the vehicle 102 is arriving toward the barrier 104 based on the geo-location associated with the barrier 104 as stored on the barrier profile. In one embodiment, when the location determinant module 128 determines that the vehicle 102 is arriving towards the barrier 104, the location determinant module 128 may communicate the location of the vehicle 102 and the traveling direction of the vehicle 102 to the dynamic zone module 130.

In one embodiment, upon receipt of data associated with the arrival of the vehicle 102 from the location determinant module 128, the dynamic zone module 130 may determine the dynamic arrival status zone associated with the barrier 104 that specifically pertain to the arrival of the vehicle 102 towards the barrier 104. As shown in the illustrative example of FIG. 2, a boundary 202a of a dynamic arrival status zone 202b may be provided as an RF signal actuation trigger point for the barrier control system 124 to utilize the vehicle communication system 122 to send (e.g., transmit) one or more status request signals (e.g., RF signals) to the transceiver 134 to be evaluated by the barrier controller 108. In one embodiment, the boundary 202a may be provided at a determined distance from the barrier 104 that may include a predetermined default distance (e.g., 100 m) or a distance previously determined by the dynamic zone module 130.

In particular, the dynamic arrival status zone 202b may be modified to provide the current state of the barrier 104 to the barrier control system 124 at an earliest possible point. This functionality may account for the speed of the vehicle 102 as it is arriving towards the barrier 104. In other words, when the vehicle 102 is arriving towards the barrier 104 and is being driven at a particular rate of speed, the boundary 202a may be moved further from the barrier 104 or closer to the barrier 104 as required in order for the barrier control system 124 to determine the current state of the barrier 104 at a first opportunity and location where it is possible to send and receive RF signals between the vehicle communication system 122 and the transceiver 134. This functionality may ensure that the state of the barrier 104 is determined in time for the barrier control system 124 to operably control the vehicle communication system 122 to possibly send the barrier control signal(s) to traverse the barrier 104 to the opened state as the vehicle 102 approaches the barrier 104.

In one embodiment, as the vehicle 102 is driven during normal operation and arrives towards the barrier 104, the dynamic zone module 130 may communicate with the barrier control system 124 to determine if the vehicle communication system 122 is able to successfully send (i.e., transmit) the status request (RF) signal(s) to the transceiver 134. In particular, when the vehicle communication system 122 sends the status request signal(s), the dynamic zone module 130 may receive a respective indication from the barrier control system 124 indicating that the vehicle communication system 122 has sent the status request signal(s) to the transceiver 134 operably connected to the barrier controller 108. Upon receiving the indication, the dynamic zone module 130 may start a timer for a predetermined period (e.g., 3 seconds) to determine if the transceiver 134 is able to successfully receive the status request signal(s) from a current distance (e.g., where the boundary 202a is currently located with respect to the barrier 104) of the boundary 202a within the predetermined period of time. If the transceiver 134 is able to receive the status request signal(s) from the current distance of the boundary 202a, the barrier controller 108 may evaluate the signal(s) and may utilize the transceiver 134 to send (i.e., transmit) one or more current state data signals (e.g., RF signals) to the vehicle communication system 122.

As described below, the current state data signal(s) may be evaluated by the barrier control system 124 to determine the current state of the barrier 104. Upon receiving and evaluating the current state data signal(s), the barrier control system 124 may communicate an indication of the receipt of the barrier status to the dynamic zone module 130 to indicate the successful sending of the status request RF signal(s) within the predetermined period of time. Consequently, the dynamic zone module 130 may determine the successful sending of the status request signal(s) from the current distance of the boundary 202a. However, if the transceiver 134 is not able to receive the status request signal(s) from the boundary 202a, the dynamic zone module 130 will not receive the indication of the receipt of the barrier status within the predetermined period of time. Consequently, the dynamic zone module 130 may determine an unsuccessful sending of the status request signal(s) from the current distance of the boundary 202a.

In one or more embodiments, the dynamic zone module 130 may initially provide the boundary 202a of the dynamic arrival status zone 202b at the default distance from the barrier 104 (e.g., 100 m). If the dynamic zone module 130 determines the successful sending of the status request signal(s) from the current distance of the boundary 202a once (i.e., during one trial), the dynamic zone module 130 may further determine if the status request signal(s) are successfully sent a predetermined number of additional times (e.g., n=5 additional trials). In other words, the dynamic zone module 130 may communicate with the barrier control system 124 during a number (e.g., n=5) of successive arrivals of the vehicle 102 towards the barrier 104 to determine if the status request signal(s) are successfully sent the predetermined number of additional times from the default distance of the boundary 202a to the barrier 104.

If the dynamic zone module 130 determines that the status request signal(s) is successfully sent for the predetermined number of additional times, the module 130 may modify the distance between the boundary 202a and the barrier 104 from the default or determined distance to a current distance to extend the dynamic arrival status zone 202b. More particularly, the dynamic zone module 130 may extend the dynamic arrival status zone 202b by a predetermined distance (e.g., 5 m) to provide the boundary 202a at the current distance (e.g., 105 m, instead of 100 m as previously provided). The dynamic zone module 130 may respectively determine the successful sending of the status request signal(s) to further extend the dynamic arrival status zone 202b (e.g., by 5 m, 10 m, etc.) if the status request signal(s) are successfully sent from the current distance and again successfully sent the predetermined number of additional times from the current distance.

If the dynamic zone module 130 determines the unsuccessful sending of the status request signal(s) from the current distance of the boundary 202a, the dynamic zone module 130 may immediately reduce the dynamic arrival status zone 202b to ensure that the barrier control system 124 may determine the current state of the barrier 104. More specifically, the dynamic zone module 130 may reduce the dynamic arrival status zone 202b by predetermined value (e.g., 25 m) such that the boundary 202a is provided at the (modified) current distance (e.g., 75 m, instead of 100 m as previously provided). Upon modifying the current distance between the boundary 202a and the barrier 104, the dynamic zone module 130 may determine if the status request signal(s) is successfully sent to the transceiver 134 from the (modified) current distance (i.e., pertaining to the reduced dynamic arrival status zone 202b).

It is to be appreciated that in some embodiments the dynamic zone module 130 may continuously determine the successful sending and possible modification of the current distance between the boundary 202a and the barrier 104 to dynamically resize the dynamic arrival status zone 202b in real-time during each instance at which the vehicle 102 is arriving towards the barrier 104. This functionality may continuously ensure that the state of the barrier 104 is determined by the barrier control system 124 in time to possibly send the barrier control signal(s) to traverse the barrier 104 to the opened state as the vehicle 102 approaches the barrier 104.

In an exemplary embodiment, upon determining the dynamic arrival status zone 202b at the dynamic distance from the barrier 104, the dynamic zone module 130 may store a plurality of GPS coordinates associated with a boundary 202a of the dynamic arrival status zone 202b. In one or more embodiments, upon determining the dynamic arrival status zone, the dynamic zone module 130 may communicate with the navigation system 126 to determine the plurality of GPS coordinates (e.g., latitude x, longitude y) of the areas that include the boundary 202a of the dynamic arrival status zone 202b. Upon determining the plurality of GPS coordinates associated with the portions of the boundary 202a, the navigation system 126 may communicate the plurality of GPS coordinates to the dynamic zone module 130. The dynamic zone module 130 may access the barrier profile associated with the barrier 104 stored on the storage unit 116 and may populate the plurality of GPS coordinates associated with portions of the boundary 202a of the dynamic arrival status zone 202b.

If the dynamic zone module 130 modifies the current distance between the boundary 202a and the barrier 104, thereby modifying the size of the dynamic arrival status zone 202b, the dynamic zone module 130 may update the barrier profile with updated GPS coordinates associated with the portions of the boundary 202a. As discussed below, the plurality of GPS coordinates populated within the barrier profile may be evaluated in order to send the status request signal(s) from the barrier control system 124 to the barrier controller 108 upon the vehicle entering the dynamic arrival status zone 202b during the arrival towards the barrier 104. In one or more embodiments, the dynamic zone module 130 may also communicate the plurality of GPS coordinates associated with the dynamic arrival status zone 202b to the control zone module 132 of the application 106 to be further utilized to determine the barrier opening zone.

In one or more embodiments, the barrier control system 124 may utilize the determined dynamic arrival status zone 202b to determine the current state of the barrier 104 as the vehicle 102 arrives towards the barrier 104 during daily travel. As an illustrative example, when the location determinant module 128 determines that the vehicle 102 is entering the dynamic arrival status zone 202b based on the plurality of GPS coordinates populated within the barrier profile by the dynamic zone module 130, the barrier control system 124 may utilize the vehicle communication system 122 to send at least one status request signal to the barrier controller 108. Upon receiving the status request signal(s), the barrier controller 108 may determine the current state of the barrier 104 and may utilize the transceiver 134 to communicate the one or more current state data signals that include the current state of the barrier 104 as the opened state, the closed state, or the partially opened state to the vehicle communication system 122.

With continued reference to FIG. 2, the control zone module 132 may determine the location of the boundary 204a of the barrier opening zone 204b and the size of the barrier opening zone 204b based on one or more variables that ensure that the boundary 204a of the barrier opening zone 204b may be provided at an adequate distance from the barrier 104. The adequate distance may ensure that the barrier control signal(s) may be sent from the vehicle 102 to traverse the barrier 104 to the opened state as the vehicle 102 approaches the barrier 104. For example, the boundary 204a of the barrier opening zone 204b may be provided at a determined distance of 30 m from any portion of the boundary 204a to the barrier 104.

In one embodiment, the control zone module 132 may determine the boundary 204a of the barrier opening zone 204b at a predetermined distance (e.g., 50 m) from the dynamic arrival status zone 202b. In particular, upon sending the status request signal(s) to determine the current state of the barrier 104, the vehicle 102 will travel the predetermined distance towards the barrier 104 before the barrier control signal(s) is sent to be evaluated by the barrier controller 108. Consequently, if the size and/or location of the dynamic arrival status zone 202b is modified, the size of the barrier opening zone 204b may be modified. In other words, when the current distance between the boundary 202a and the barrier 104 is modified, as the location of the boundary 202a is dynamically changing, the current distance between the boundary 204a and the barrier 104 may also be modified accordingly.

In an additional embodiment, the control zone module 132 may analyze data pertaining to the surrounding environment of the vehicle 102 provided by the map database 126b and may determine the barrier opening zone 204b according to one or more environmental variables. The one or more environmental variables may include, but are not limited to, the length of the street(s) 206 within a vicinity of the barrier 104, the length of the driveway(s) 208 leading up to the barrier 104, the location of the surrounding structures/ object(s) within the vicinity of the barrier 104, and the like. In particular, the control zone module 132 may determine the size of the barrier opening zone 204b to ensure that the barrier control signal(s) may be transmitted to the transceiver 134 at a time that the vehicle 102 is at a requisite distance from the barrier 104. This functionality may ensure that the barrier control signal(s) are sent at an appropriate time to fully open the barrier 104 upon the arrival of the vehicle 102 towards the barrier 104 without compromising the security of contents located behind the barrier 104. For example, in a scenario where the barrier 104 is located at an end of a short driveway 208, the barrier opening zone 204b may include a smaller area surrounding the barrier 104 than a scenario where the barrier 104 is located at an end of a long driveway 208.

Upon determining the barrier opening zone 204b at the predetermined distance from the barrier 104, the control zone module 132 may store a plurality of GPS coordinates associated with a boundary 204a of the barrier opening zone 204b. In an exemplary embodiment, upon determining the barrier opening zone 204b, the control zone module 132 may communicate with the navigation system 126 to determine the plurality of GPS coordinates (e.g., latitude x, longitude y) of the areas that include the boundary 204a of the barrier opening zone 204b. Upon determining the plurality of GPS coordinates associated with the portions of the boundary 204a, the navigation system 126 may communicate the plurality of GPS coordinates to the control zone module 132.

The control zone module 132 may access the barrier profile associated with the barrier 104 stored on the storage unit 116 and may populate the plurality of GPS coordinates associated with portions of the boundary 204a of the barrier opening zone 204b. In one embodiment, if the control zone module 132 modifies the current distance between the boundary 204a and the barrier 104, thereby modifying the size of the barrier opening zone 204b, the dynamic zone module 130 may update the barrier profile with updated GPS coordinates associated with the portions of the boundary 204a. As discussed below, the plurality of GPS coordinates populated within the barrier profile may be evaluated in order to send the barrier control signal(s) to the barrier controller 108 upon the vehicle 102 entering the barrier opening zone 204b during the arrival of the vehicle 102 towards the barrier 104.

In one or more embodiments, the barrier control system 124 may utilize the determined barrier opening zone 204b to traverse the barrier 104 to the opened state when the barrier control system 124 determines that the barrier 104 is in the closed state or the partially opened state based on receiving the current state of the barrier 104 upon entering the dynamic arrival status zone 202b as the vehicle 102 arrives towards the barrier 104 during daily travel. As an illustrative example, when the vehicle 102 enters the barrier opening zone 204b the barrier control system 124 may utilize the vehicle communication system 122 to send at least one barrier control signal to the barrier controller 108 to traverse the barrier 104 to the opened state if the barrier 104 is determined to be in the closed state or the semi-opened state based on the vehicle 102 entering the dynamic arrival status zone 202b.

It is to be appreciated that the dynamic zone module 130 may determine multiple respective dynamic arrival status zones and barrier opening zones that may be utilized for multiple barriers. For example, if the home of the user includes a gate as a first barrier and a garage door as a second barrier, the dynamic zone module 130 may determine a dynamic arrival status zone pertaining to the gate and a separate dynamic arrival status zone pertaining to the garage door. Additionally, the control zone module 132 may determine a barrier opening zone pertaining to the gate and a separate barrier opening zone pertaining to the garage door.

Figure 3:
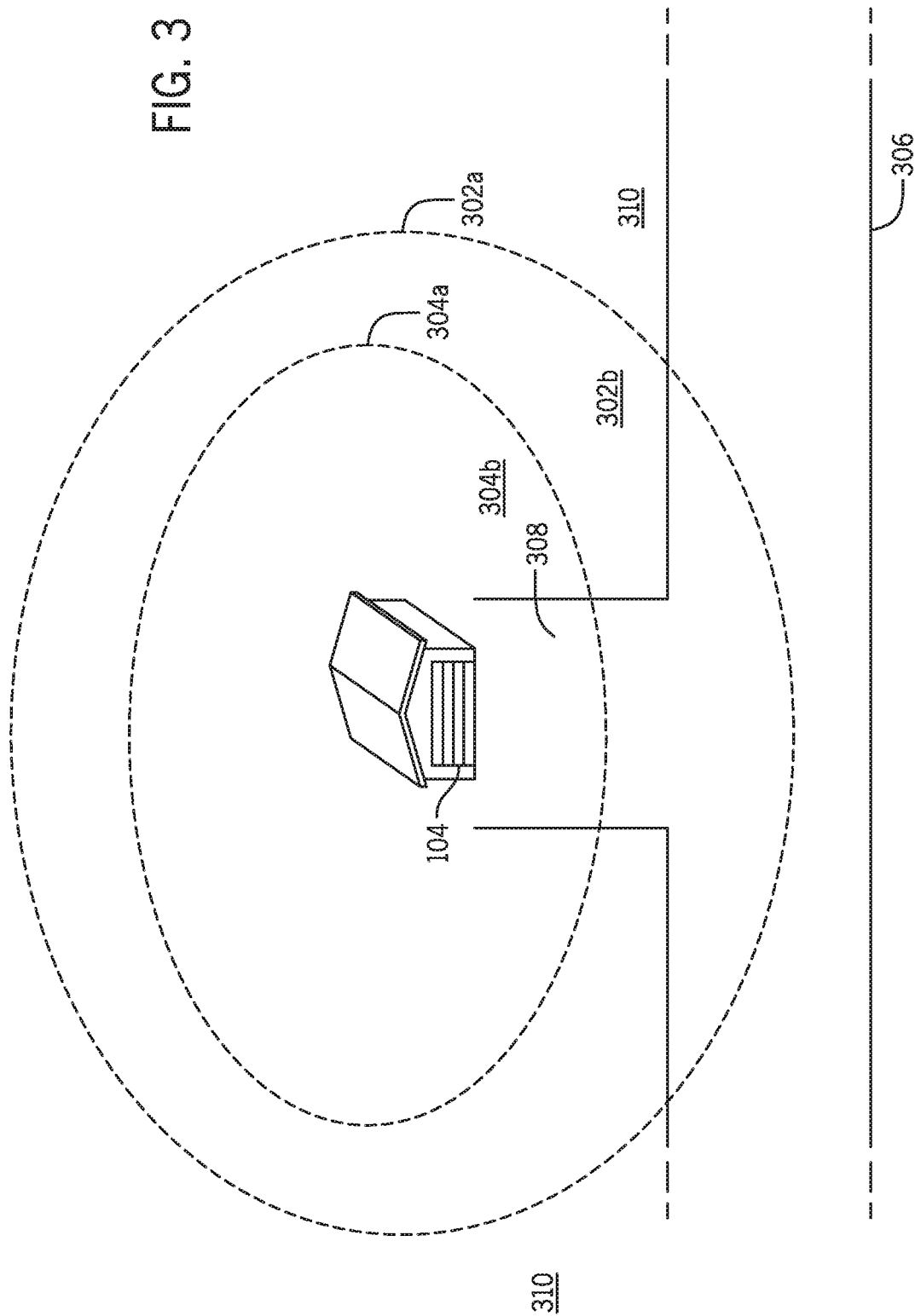
FIG. 3 is an illustrative example of the plurality of zones associated with the barrier that may be applied when the vehicle is determined to be departing away from the barrier according to an exemplary embodiment.

FIG. 3 is an illustrative example of the plurality of zones associated with the barrier 104 that may be applied when the vehicle 102 is determined to be departing away from the barrier 104 according to an exemplary embodiment. As discussed, when the location determinant module 128 determines that the vehicle 102 is departing away from the barrier 104, the location determinant module 128 may communicate the location of the vehicle 102 and the traveling direction of the vehicle 102 to the dynamic zone module 130 and the control zone module 132. The modules 130, 132 may determine the plurality of zones associated with the barrier 104 that specifically pertain to the departure of the vehicle 102 away from the barrier 104.

As shown in the illustrative example of FIG. 3, a boundary 302a of the dynamic departure status zone 302b may be provided as an RF signal actuation trigger point for the barrier control system 124 to utilize the vehicle communication system 122 to send at least one status request signal to the transceiver 134 to be evaluated by the barrier controller 108. In particular, the dynamic departure status zone 302b may be modified to provide the current state of the barrier 104 to the barrier control system 124 at a latest possible point in time. This functionality may account for the speed of the vehicle 102 as it is departing away from the barrier 104 towards an area 310 outside of an RF transmission range between the vehicle communication system 122 and the transceiver 134. In other words, the dynamic departure status zone 302b may be modified to ensure that the barrier control system 124 may determine the current state of the barrier 104 (through RF signal transmission and reception) while the vehicle 102 is still within the RF transmission range in the dynamic departure status zone 302b.

For instance, when the vehicle 102 is departing away from the barrier 104 and is being driven at a particular rate of speed, the boundary 302a may be moved further from the barrier 104 or closer to the barrier 104 as required in order for the barrier control system 124 to determine the current state of the barrier 104 at a last opportunity possible to send and receive RF signals between the vehicle communication system 122 and the transceiver 134. This functionality may ensure that the state of the barrier 104 is determined and communicated to the barrier control system 124 to present the current state of the barrier 104 to the user at a point in time when the vehicle 102 is exiting the dynamic departure status zone 302b, before the vehicle communication system 122 is out of communication range with the transceiver 134.

In one embodiment, as the vehicle 102 is driven during normal operation and departs away from the barrier 104, the dynamic zone module 130 may communicate with the barrier control system 124 to determine if the vehicle communication system 122 is able to successfully send (i.e., transmit) the status request (RF) signal(s) to the transceiver 134 at a further distance than the first determined distance from the barrier 104. In particular, when the vehicle communication system 122 sends the status request signal(s), the dynamic zone module 130 may receive a respective indication from the vehicle communication system 122. Upon receiving the indication, the dynamic zone module 130 may start a timer for a predetermined period (e.g., 3 seconds) to determine if the transceiver 134 is able to successfully receive the status request signal(s) from a current distance (e.g., where the boundary 302a is currently located with respect to the barrier 104) of the boundary 302a within the predetermined period of time. If the transceiver 134 is able to receive the status request signal(s) from the current distance of the boundary 302a, the barrier controller 108 may evaluate the signal(s) and may utilize the transceiver 134 to send (i.e., transmit) one or more current state data signals to the vehicle communication system 122.

Upon receiving and evaluating the current state data signal(s), the barrier control system 124 may communicate an indication of the receipt of the barrier status to the dynamic zone module 130 to indicate the successful sending of the status request RF signal(s) within the predetermined period of time. Consequently, the dynamic zone module 130 may determine the successful sending of the status request signal(s) from the current distance of the boundary 302a. Conversely, if the transceiver 134 is not able to receive the status request signal(s) from the boundary 302a, the dynamic zone module 130 will not receive the indication of the receipt of the barrier status within the predetermined period of time. Consequently, the dynamic zone module 130 may determine an unsuccessful sending of the status request signal(s) from the current distance of the boundary 302a.

In one or more embodiments, the dynamic zone module 130 may initially provide the boundary 302a of the dynamic departure status zone 302b at a default distance from the barrier 104 (e.g., 100 m). If the dynamic zone module 130 determines the successful sending of the status request signal(s) from the current distance of the boundary 302a once (i.e., during one trial) the dynamic zone module 130 may further determine if the status request signal(s) are successfully sent a predetermined number of additional times (e.g., n=5 additional trials). In other words, the dynamic zone module 130 may communicate with the barrier control system 124 during a number (e.g., n=5) of successive departures of the vehicle 102 away from the barrier 104 to determine if the status request signal(s) are successfully sent a predetermined number of additional times from the default distance of the boundary 302a to the barrier 104.

If the dynamic zone module 130 determines that the status request signal(s) is successfully sent for the predetermined number of additional times, the module 130 may modify the distance between the boundary 302a and the barrier 104 from the default distance to a current distance to extend the dynamic departure status zone 302b. More particularly, the dynamic zone module 130 may extend the dynamic departure status zone 302b by a predetermined distance (e.g., 5 m) to provide the boundary 302a at the current distance (e.g., 105 m, instead of 100 m as previously provided). The dynamic zone module 130 may respectively determine the successful sending of the status request signal(s) to further extend the dynamic departure status zone 302b (e.g., by 5 m, 10 m, etc.) if the status request signal(s) are successfully sent from the current distance and again successfully sent the predetermined number of additional times from the current distance.

If the dynamic zone module 130 determines the unsuccessful sending of the status request signal(s) from the current distance of the boundary 302a, the dynamic zone module 130 may immediately reduce the dynamic departure status zone 302b to ensure that the barrier status determinant module 150 may determine the current state of the barrier 104 at a point when the vehicle 102 exits the dynamic departure status zone 302b before the vehicle 102 enters the area 310. More specifically, the dynamic zone module 130 may reduce the dynamic departure status zone 302b by a predetermined value (e.g., 25 m) such that the boundary 302a is provided at the current distance (e.g., 75 m, instead of 100 m as previously provided).

Upon modifying the current distance between the boundary 302a and the barrier 104, the dynamic zone module 130 may determine if the status request signal(s) is successfully sent to the transceiver 134 from the (modified) current distance (i.e., pertaining to the reduced dynamic departure status zone 302b). It is to be appreciated that the dynamic zone module 130 may continuously determine the successful sending and possible modification of the current distance between the boundary 302a and the barrier 104. This functionality may continuously resize the dynamic departure status zone 302b to continuously ensure that the state of the barrier 104 is determined and communicated to barrier control system 124 to present the current state of the barrier 104 to the user at a point in time when the vehicle 102 exits the dynamic departure status zone 302b. In other words, the dynamic departure status zone 302b may be sized to ensure that the current state of the barrier 104 is determined at a particular point when the vehicle 102 exits the dynamic departure status zone 302b before the vehicle communication system 122 is out of RF transmission range with respect to the transceiver 134 upon the vehicle 102 entering the area 310 outside of an RF transmission range between the vehicle communication system 122 and the transceiver 134.

Upon determining the dynamic departure status zone 302b at the dynamic distance from the barrier 104, the dynamic zone module 130 may store a plurality of GPS coordinates associated with a boundary 302a of the dynamic departure status zone 302b. In one or more embodiments, upon determining the dynamic departure status zone, the dynamic zone module 130 may communicate with the navigation system 126 to determine the plurality of GPS coordinates (e.g., latitude x, longitude y) of the areas that include the boundary 302a of the dynamic departure status zone 302b. Upon determining the plurality of GPS coordinates associated with the portions of the boundary 302a, the navigation system 126 may communicate the plurality of GPS coordinates to the dynamic zone module 130.

The dynamic zone module 130 may access the barrier profile associated with the barrier 104 stored on the storage unit 116 and may populate the plurality of GPS coordinates associated with portions of the boundary 302a of the dynamic departure status zone 302b. If the dynamic zone module 130 modifies the current distance between the boundary 302a and the barrier 104, thereby modifying the size of the dynamic departure status zone 302b, the dynamic zone module 130 may update the barrier profile with updated GPS coordinates associated with the portions of the boundary 302a. As discussed below, the plurality of GPS coordinates populated within the barrier profile may be evaluated in order to send the status request signal(s) to the barrier controller 108 upon the vehicle 102 being located the predetermined distance from exiting the dynamic departure status zone 302b during the departure away from the barrier 104. In one or more embodiments, the dynamic zone module 130 may also communicate the plurality of GPS coordinates associated with the dynamic arrival status zone 310b to the control zone module 132 of the application 106 to be further utilized to determine the barrier opening zone 204b.

In one or more embodiments, the barrier control system 124 may utilize the determined dynamic departure status zone 302b to determine the current state of the barrier 104 as the vehicle 102 departs away from the barrier 104 during daily travel. As an illustrative example, when the location determinant module 128 determines that the vehicle 102 is exiting the dynamic departure status zone 302b based on the plurality of GPS coordinates populated within the barrier profile by the dynamic zone module 130, the barrier control system 124 may utilize the vehicle communication system 122 to send at least one status request signal to the barrier controller 108. Upon receiving the status request signal(s), the barrier controller 108 may determine the current state of the barrier 104 and may utilize the transceiver 134 to communicate the one or more current state data signals that include the current state of the barrier 104 as the opened state, the closed state, or the partially opened state to the vehicle communication system 122.

With continued reference to FIG. 3, the control zone module 132 may determine the location of the boundary 304a of a barrier closing zone 304b at a second determined distance from the barrier 104. As shown in the illustrative example of FIG. 3, the size of the barrier closing zone 304b may be based on one or more variables that ensures that the boundary 304a of the barrier closing zone 304b may be provided at an adequate distance (e.g., 15 m) from the barrier 104 to send the barrier control signal(s) to traverse the barrier 104 to the closed state before the vehicle 102 enters into the area 310 that is outside of an RF transmission range between the vehicle communication system 122 and the transceiver 134.

In one embodiment, the dynamic zone module 130 may determine the barrier closing zone 304b at a predetermined distance (e.g., 60 m) from the dynamic departure status zone 302b. In particular, upon sending the barrier control signal(s) to the barrier controller 108 to traverse the barrier 104 to the closed state, the vehicle 102 will travel the predetermined distance away from the barrier 104 before sending the status request signal(s) to determine the current state of the barrier 104 to provide the current states of the barrier 104 to the user to verify that the barrier 104 has traversed to the (fully) closed state. Consequently, if the size and/or location of the dynamic departure status zone 302b is modified, the size and/or location of the barrier closing zone 304b may be modified. In other words, when the current distance between the boundary 302a and the barrier 104 is modified, the current distance between the boundary 304a of the barrier 104 may be modified accordingly.

In an exemplary embodiment, upon determining the barrier closing zone 304b, the control zone module 132 may store a plurality of GPS coordinates associated with a boundary 304a of the barrier closing zone 304b. In an exemplary embodiment, upon determining the barrier closing zone 304b, the control zone module 132 may communicate with the navigation system 126 to determine the plurality of GPS coordinates (e.g., latitude x, longitude y) of the areas that include the boundary 304a of the barrier closing zone 304b. Upon determining the plurality of GPS coordinates associated with the portions of the boundary 304a, the navigation system 126 may communicate the plurality of GPS coordinates to the control zone module 132.

The control zone module 132 may access the barrier profile associated with the barrier 104 stored on the storage unit 116 and may populate the plurality of GPS coordinates associated with portions of the boundary 304a of the barrier closing zone 304b. In one or more embodiments, if the dynamic zone module 130 modifies the current distance between the boundary 304a and the barrier 104, thereby modifying the size of the barrier closing zone 304b, the dynamic zone module 130 may update the barrier profile with updated GPS coordinates associated with the portions of the boundary 304a. As discussed below, the plurality of GPS coordinates populated within the barrier profile may be evaluated in order to send the barrier control signal(s) to the barrier controller 108 upon the vehicle 102 exiting the barrier closing zone 304b during the departure away from the barrier 104.

In one or more embodiments, the barrier control system 124 may utilize the determined barrier opening zone 204b to traverse the barrier 104 to the opened state when the barrier control system 124 determines that the barrier 104 is in the closed state or the partially opened state based on receiving the current state of the barrier 104 upon entering the dynamic arrival status zone 202b as the vehicle 102 arrives towards the barrier 104 during daily travel. As an illustrative example, when the vehicle 102 exits the barrier closing zone 304b the barrier control system 124 may utilize the vehicle communication system 122 to send at least one barrier control signal to the barrier controller 108 to traverse the barrier 104 to the closed state.

It is to be appreciated that the dynamic zone module 130 and the control zone module 132 may determine multiple respective dynamic departure status zones and barrier closing zones that may be utilized for multiple barriers. For example, if the home of the user includes a gate as a first barrier and a garage door as a second barrier, the dynamic zone module 130 may determine a dynamic departure status zone pertaining to the gate and a separate dynamic departure status zone pertaining to the garage door. Additionally, the control zone module 132 may determine a barrier closing zone pertaining to the gate and a separate barrier closing zone pertaining to the garage door.

Figure 4:
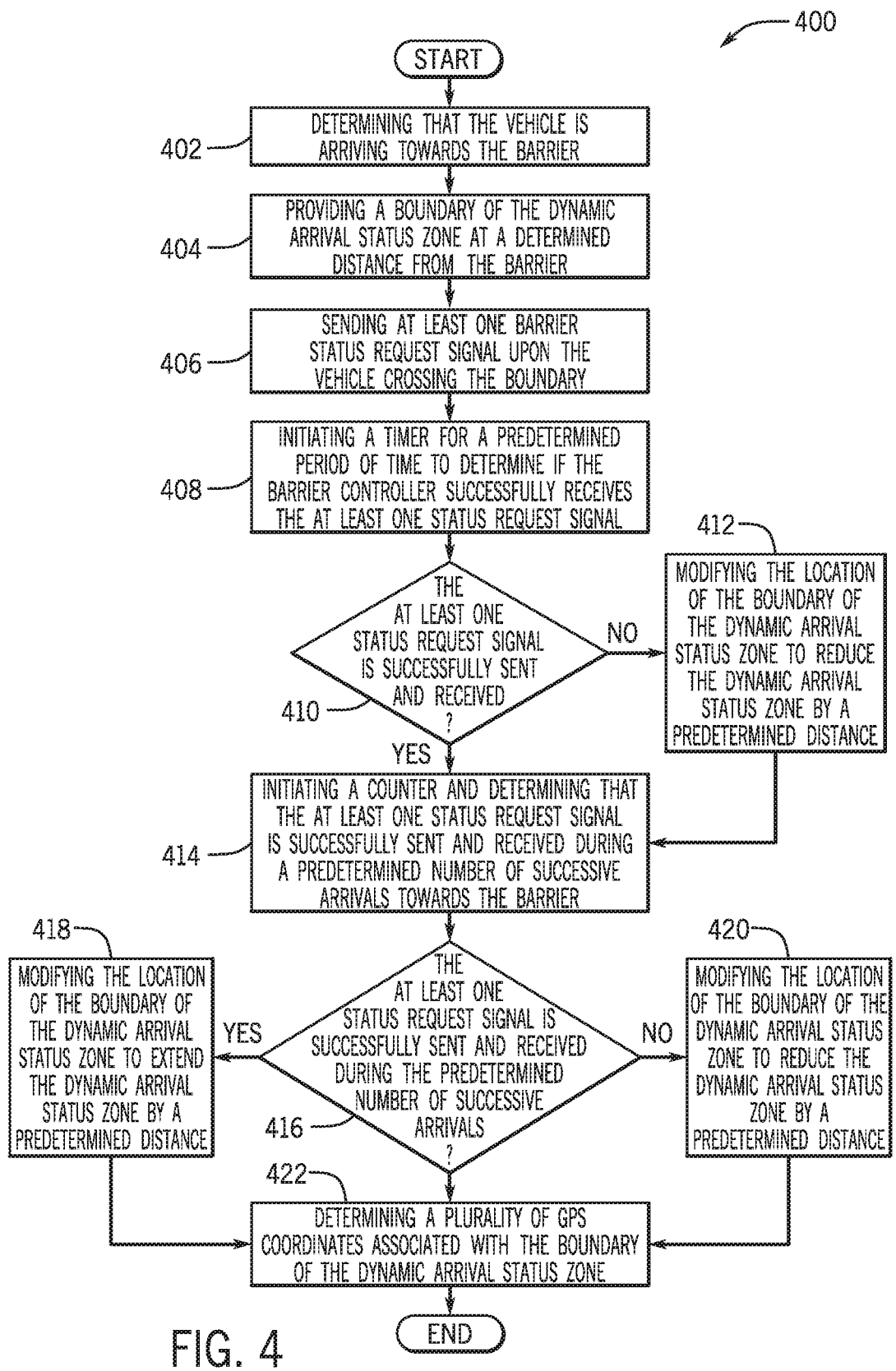
FIG. 4 is a process flow diagram of a method for determining at least one dynamic arrival status zone associated with the barrier based on the traveling direction of the vehicle according to an exemplary embodiment.

IV. Methods Related to Determining at Least One Zone Associated with Automatic Control of a Barrier FIG. 4 is a process flow diagram of a method 400 for determining at least one dynamic arrival status zone 202b associated with the barrier 104 based on the traveling direction of the vehicle 102 according to an exemplary embodiment. FIG. 4 will be described with reference to the components of FIG. 1 and the illustrative example of FIG. 2, though it is to be appreciated that the method 400 of FIG. 4 may be executed with other system, components, and/or examples. The method 400 may begin at block 402, wherein the method 400 may include determining that the vehicle 102 is arriving towards the barrier 104. In an exemplary embodiment, the location determinant module 128 may determine that the vehicle 102 is arriving towards the barrier 104 based on the geo-location associated with the barrier 104 as stored on the barrier profile. Upon determining that the vehicle 102 is arriving towards the barrier 104, the location determinant module 128 may communicate the location of the vehicle 102 and the traveling direction of the vehicle 102 to the dynamic zone module 130.

The method 400 may proceed to block 404, wherein the method 400 may include providing a boundary 202a of the dynamic arrival status zone 202b at a determined distance from the barrier 104. In one embodiment, upon determining that the vehicle 102 is arriving towards the barrier 104 based on the received communication from the location determinant module 128, the dynamic zone module 130 may provide the boundary 202a at a predetermined default distance or a distance previously determined as an earliest possible point at which the barrier control system 124 of the vehicle 102 may send and receive one or more status request signals with the barrier controller 108.

The method 400 may proceed to block 406, wherein the method 400 may include sending at least one barrier status request signal upon the vehicle 102 crossing the boundary 202a. In one embodiment, as the vehicle 102 arrives towards the barrier 104, the location determinant module 128 may communicate with the barrier control system 124 and the dynamic zone module 130 as to when the vehicle 102 crosses the boundary 202a. The barrier control system 124 may utilize the vehicle communication system 122 to send one or more barrier status request signals to the transceiver 134 operably connected to the barrier controller 108.

The method 400 may proceed to block 408, wherein the method 400 may include initiating a timer for a predetermined period of time to determine if the barrier controller 108 successfully receives the at least one status request signal. In one embodiment, if the transceiver 134 is able to receive the one or more status request signals sent by the vehicle communication system 122 (at block 406), the barrier controller 108 may evaluate the signal(s) and may utilize the transceiver 134 to send one or more current state data signals to the vehicle communication system 122. In one embodiment, if the one or more of the current state data signals is received by the vehicle communication system 122, the barrier control system 124 may communicate respective data to the dynamic zone module 130.

In an exemplary embodiment, upon the vehicle communication system sending the one or more barrier status request signals to the transceiver 134, the barrier control system 124 may send an indication to the dynamic zone module 130. As discussed above, the indication may indicate that the vehicle communication system 122 has sent the one or more status request signals to the transceiver 134. Upon receiving the indication, the dynamic zone module 130 may initiate the timer for the predetermined period of time to determine if the vehicle communication system 122 receives the one or more current state data signals to determine if the vehicle 102 is able to successfully communicate the signal(s) from the current location of the boundary 202a within the predetermined period of time.

The method 400 may proceed to block 410, wherein the method 400 may include determining if the at least one status request signal is successfully sent and received. In one embodiment, if the vehicle communication system 122 receives the one or more current state data signals that are sent by the transceiver 134 in response to the one or more status request signals, the barrier control system 124 may communicate the indication to the dynamic zone module 130. The dynamic zone module 130 may responsively determine if the one or more current state data signals have been received before the expiration of the timer to thereby determine if the at least one status request signal is successfully sent and received.

If it is determined that the at least one status request signal is not successfully sent and received (at block 410), the method 400 may proceed to block 412, wherein the method 400 may include modifying the location of the boundary 202a of the dynamic arrival status zone 202b by a predetermined distance. In an exemplary embodiment, upon determining the unsuccessful sending of the status request signal(s) from the current distance of the boundary 202a, the dynamic zone module 130 may modify the location of the boundary 202a closer to the barrier 104, thereby reducing the dynamic arrival status zone 202b by a predetermined value.

If it is determined that the at least one status request signal is successfully sent and received (at block 410) or the location of the boundary 202a of the dynamic arrival status zone 202b is modified (at block 412), the method 400 may proceed to block 414, wherein the method 400 may include initiating a counter and determining that the at least one status request signal is successfully sent and received during a determined number of successive arrivals towards the barrier 104. In one or more embodiments, the dynamic zone module 130 may determine if one or more status request signals may be successfully received by the transceiver 134 based on the successful receipt of the one or more one or more current state data signals before the expiration of the timer (as discussed in block 408) during a predetermined number of successive arrivals of the vehicle 102 towards the barrier 104. In other words, the dynamic zone module 130 may communicate with the barrier control system 124 during a number (e.g., n=5) of successive arrivals of the vehicle 102 towards the barrier 104 to determine if the status request signal(s) are successfully sent for a predetermined number of times.

The method 400 may proceed to block 416, wherein the method 400 may include determining if the at least one status request signal is successfully sent and received during the predetermined number of successive arrivals. In an exemplary embodiment, the dynamic zone module 130 may determine that the one or more status request signals are successfully sent and received during the predetermined number of successive arrivals (e.g., n=5) based on receiving a respective indication from the barrier control system 124 during each of the predetermined number of successive arrivals. The dynamic zone module 130 may also determine that the one or more status request signals are not successfully sent and received during the predetermined number of successive arrivals based on not receiving a respective indication during each of the predetermined number of successive arrivals.

If it is determined that the at least one status request signal is successfully sent and received during the predetermined number of successive arrivals (at block 416), the method 400 may proceed to block 418, wherein the method 400 may include modifying the location of the boundary 202a of the dynamic arrival status zone 202b to extend the dynamic arrival status zone 202b by a predetermined distance. In an exemplary embodiment, if the dynamic zone module 130 determines that the one or more status request signals are successfully sent and received for the predetermined number of successive arrivals, the dynamic zone module 130 may modify the distance between the boundary 202a and the barrier 104 to extend the dynamic arrival status zone 202b. It is to be appreciated that during successive arrivals of the vehicle 102 after extending the dynamic arrival status zone 202b by modifying the distance of the boundary 202a and the barrier 104, the dynamic zone module 130 may continually determine if the one or more status request signals are successfully sent to the transceiver 134 from the extended dynamic arrival status zone 202b to thereby further extend the zone 202b or reduce the zone 202b.

If it determined that the at least one status request signal is not successfully sent and received during the predetermined number of successive arrivals (at block 416), the method 400 may proceed to block 420, wherein the method 400 may include modifying the location of the boundary 202a of the dynamic arrival status zone 202b to reduce the dynamic arrival status zone 202b by a predetermined distance. In one embodiment, if the dynamic zone module 130 determines that the one or more status request signals are not successfully sent and received for the predetermined number of successive arrivals, the dynamic zone module 130 may modify the distance between the boundary 202a and the barrier 104 to reduce the dynamic arrival status zone 202b. It is to be appreciated that during successive arrivals of the vehicle 102 after reducing the dynamic arrival status zone 202b by modifying the distance of the boundary 202a and the barrier 104, the dynamic zone module 130 may continually determine if the one or more status request signals are successfully sent to the transceiver 134 from the reduced dynamic arrival status zone 202b to thereby further extend the zone 202b or reduce the zone 202b.

The method 400 may proceed to block 422, wherein the method 400 may include determining a plurality of GPS coordinates associated with the boundary 202a of the dynamic arrival status zone 202b. In an exemplary embodiment, upon modifying the location of the boundary 202a of the dynamic arrival status zone 202b (at block 418 or block 420), the dynamic zone module 130 may store a plurality of GPS coordinates associated with the boundary 202a. More specifically, the dynamic zone module 130 may communicate with the navigation system 126 to determine the plurality of GPS coordinates of the areas that include the boundary 202a and may update the barrier profile associated with the barrier 104 with the plurality of GPS coordinates. The plurality of GPS coordinates may be utilized by the location determinant module 128 to determine when the vehicle 102 enters the dynamic arrival status zone 202b each time the vehicle 102 is determined to travel towards the barrier 104.

Figure 5:
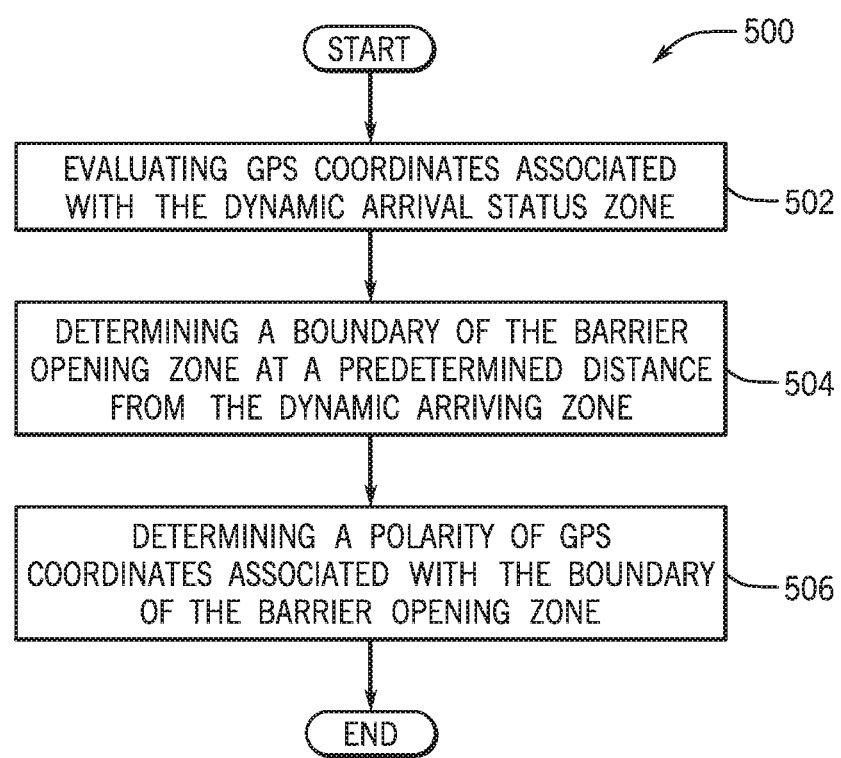
FIG. 5 is a process flow diagram of a method for determining at least one barrier opening zone associated with the barrier based on the at least one dynamic arrival status zone according to an exemplary embodiment.

FIG. 5 is a process flow diagram of a method 500 for determining at least one barrier opening zone 204b associated with the barrier 104 based on the at least one dynamic arrival status zone 202b according to an exemplary embodiment. FIG. 5 will be described with reference to the components of FIG. 1 and the illustrative example of FIG. 2, though it is to be appreciated that the method 500 of FIG. 5 may be executed with other system, components, and/or examples. The method 500 may begin at block 502, wherein the method 500 may include evaluating GPS coordinates associated with the dynamic arrival status zone 202b. In one embodiment, upon determining the plurality of GPS coordinates associated with the boundary 202a, the dynamic zone module 130 may communicate the plurality of GPS coordinates associated with the boundary 202a (in addition to storing them within the barrier profile) to the control zone module 132. The control zone module 132 may evaluate the plurality of GPS coordinates to determine the location of the boundary 202a of the dynamic arrival status zone 202b with respect to the barrier 104.

The method 500 may proceed to block 504, wherein the method 500 may include determining a boundary 204a of the barrier opening zone 204b at a predetermined distance from the dynamic arrival status zone 202b. In one embodiment, the control zone module 132 may determine the boundary 204a of the barrier opening zone 204b at a predetermined distance (e.g., 50 m) from the dynamic arrival status zone 202b. Consequently, if the size and/or location of the dynamic arrival status zone 202b is modified based on the execution of the method 400 of FIG. 4, the size and location of the barrier opening zone 204b may also be modified accordingly.

The method 500 may proceed to block 506, wherein the method 500 may include determining a plurality of GPS coordinates associated with the boundary 204a of the barrier opening zone 204b. In one embodiment, upon determining the boundary 204a, the control zone module 132 may store a plurality of GPS coordinates associated with the boundary 204a. More specifically, the control zone module 132 may communicate with the navigation system 126 to determine the plurality of GPS coordinates of the areas that include the boundary 204a and may update the barrier profile associated with the barrier 104 with the plurality of GPS coordinates. The plurality of GPS coordinates may be utilized by the location determinant module 128 to determine when the vehicle 102 enters the barrier opening zone 204b each time the vehicle 102 is determined to travel towards the barrier 104.

Figure 6:
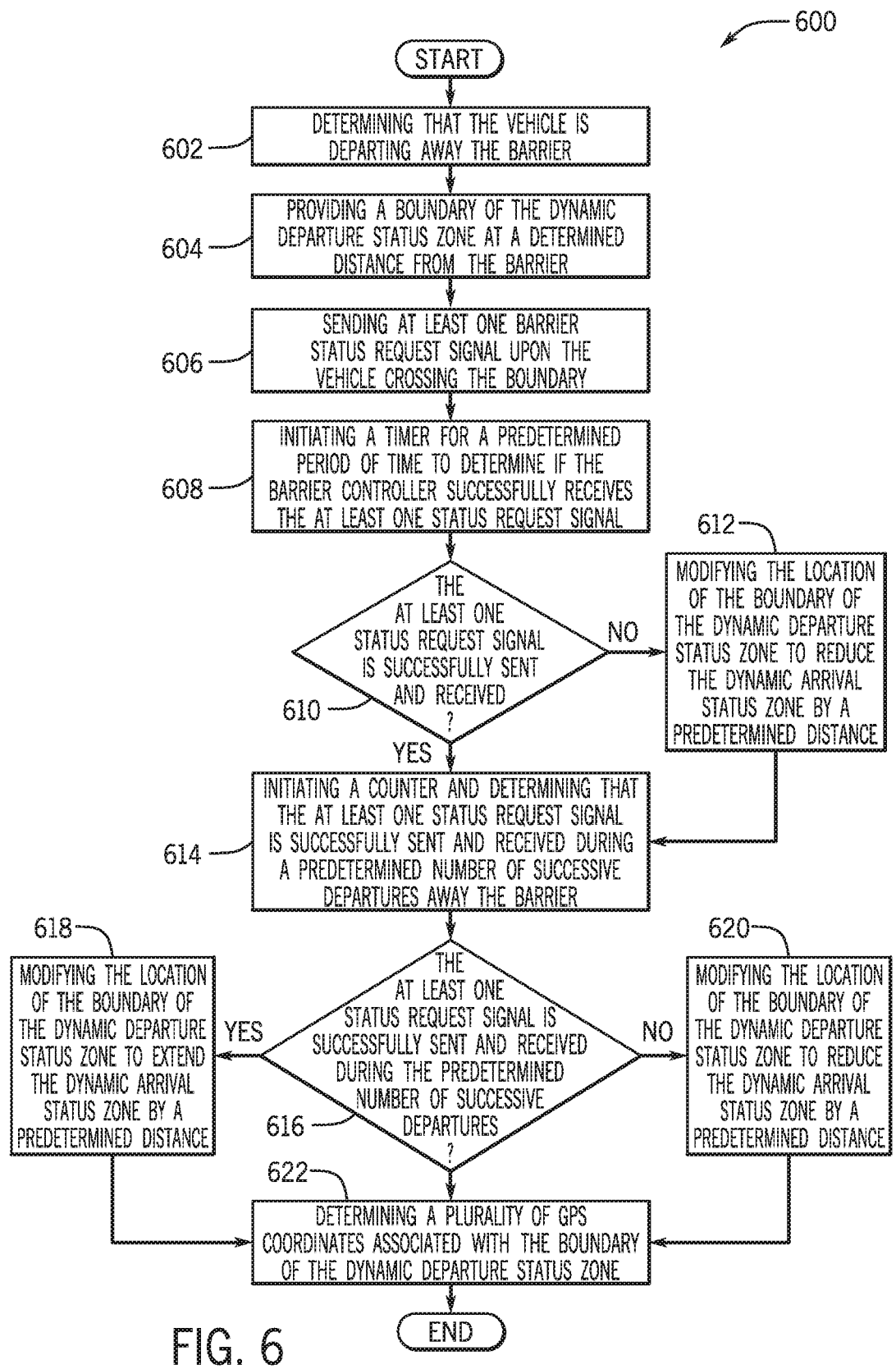
FIG. 6 is a process flow diagram of a method for determining at least one dynamic departure status zone associated with the barrier based on the traveling direction of the vehicle according to an exemplary embodiment.

FIG. 6 is a process flow diagram of a method 600 for determining at least one dynamic departure status zone 302b associated with the barrier 104 based on the traveling direction of the vehicle 102 according to an exemplary embodiment. FIG. 6 will be described with reference to the components of FIG. 1 and the illustrative example of FIG. 3, though it is to be appreciated that the method 600 of FIG. 6 may be executed with other systems, components, and/or examples. The method 600 may begin at block 602, wherein the method 600 may include determining that the vehicle 102 is departing away from the barrier 104. In an exemplary embodiment, the location determinant module 128 may determine that the vehicle 102 is departing away from the barrier 104 based on the geo-location associated with the barrier 104 as stored on the barrier profile. Upon determining that the vehicle 102 is departing away from the barrier 104, the location determinant module 128 may communicate the location of the vehicle 102 and the traveling direction of the vehicle 102 to the dynamic zone module 130.

The method 600 may proceed to block 604, wherein the method 600 may include providing a boundary 302a of the dynamic departure status zone 302b at a determined distance from the barrier 104. In one embodiment, upon determining that the vehicle 102 is departing away from the barrier 104 based on the received communication from the location determinant module 128, the dynamic zone module 130 may provide the boundary 302a at a predetermined default distance or a distance previously determined as a latest possible point at which the barrier control system 124 of the vehicle 102 may send and receive one or more status request signals with the barrier controller 108.

The method 600 may proceed to block 606, wherein the method 600 may include sending at least one barrier status request signal upon the vehicle 102 crossing the boundary 302a. In one embodiment, as the vehicle 102 departs away from the barrier 104, the location determinant module 128 may communicate to the barrier control system 124 and the dynamic zone module 130 as to when the vehicle 102 crosses the boundary 302a. The barrier control system 124 may utilize the vehicle communication system 122 to send one or more barrier status request signals to the transceiver 134 operably connected to the barrier controller 108, as the vehicle 102 exits the dynamic departure status zone 302b.

The method 600 may proceed to block 608, wherein the method 600 may include initiating a timer for a predetermined period of time to determine if the barrier controller 108 successfully receives the at least one status request signal. In one embodiment, if the transceiver 134 is able to receive the one or more status request signals sent by the vehicle communication system 122 (at block 606), the barrier controller 108 may evaluate the signal(s) and may utilize the transceiver 134 to send one or more current state data signals to the vehicle communication system 122. In one embodiment, if the one or more of the current state data signals is received by the vehicle communication system 122, the barrier control system 124 may communicate respective data to the dynamic zone module 130.

In an exemplary embodiment, upon the vehicle communication system 122 sending the one or more barrier status request signals to the transceiver 134, the barrier control system 124 may send an indication to the dynamic zone module 130. Upon receiving the indication, the dynamic zone module 130 may initiate the timer for the predetermined period of time to determine if the vehicle communication system 122 receives the one or more current state data signals to determine if the vehicle 102 is able to successfully communicate the signal(s) from the current location of the boundary 302a within the predetermined period of time.

The method 600 may proceed to block 610, wherein the method 600 may include determining if the at least one status request signal is successfully sent and received. In one embodiment, if the vehicle communication system 122 receives the one or more current state data signals that are sent by the transceiver 134 in response to the one or more status request signals, the barrier control system 124 may communicate the indication to the dynamic zone module 130. The dynamic zone module 130 may responsively determine if the one or more current state data signals have been received before the expiration of the timer to thereby determine if the at least one status request signal is successfully sent and received.

If it is determined that the at least one status request signal is not successfully sent and received (at block 610), the method 600 may proceed to block 612, wherein the method 600 may include modifying the location of the boundary 302a of the dynamic departure status zone 302b by a predetermined distance. In an exemplary embodiment, upon determining the unsuccessful sending of the status request signal(s) from the current distance of the boundary 302a, the dynamic zone module 130 may modify the location of the boundary 302a closer to the barrier 104, thereby reducing the dynamic departure status zone 302b by a predetermined value.

If it is determined that the at least one status request signal is successfully sent and received (at block 610) or the location of the boundary 302a of the dynamic departure status zone 302b is modified (at block 612), the method 600 may proceed to block 614, wherein the method 600 may include initiating a counter and determining that the at least one status request signal is successfully sent and received during a determined number of successive arrivals towards the barrier 104. In one or more embodiments, the dynamic zone module 130 may determine if one or more status request signals may be successfully received by the transceiver 134 based on the successful receipt of the one or more one or more current state data signals before the expiration of the timer (as discussed in block 608) during a predetermined number of successive departures of the vehicle 102 away from the barrier 104. In other words, the dynamic zone module 130 may communicate with the barrier control system 124 during a number (e.g., n=5) of successive departures of the vehicle 102 away from the barrier 104 to determine if the status request signal(s) are successfully sent for a predetermined number of times.

The method 600 may proceed to block 616, wherein the method 600 may include determining if the at least one status request signal is successfully sent and received during the predetermined number of successive departures. In an exemplary embodiment, the dynamic zone module 130 may determine that the one or more status request signals are successfully sent and received during the predetermined number of successive departures (e.g., n=5) based on receiving a respective indication from the barrier control system 124 during each of the predetermined number of successive departures. The dynamic zone module 130 may also determine that the one or more status request signals are not successfully sent and received during the predetermined number of successive departures based on not receiving a respective indication during each of the predetermined number of successive departures.

If it is determined that the at least one status request signal is successfully sent and received during the predetermined number of successive arrivals (at block 616), the method 600 may proceed to block 618, wherein the method 600 may include modifying the location of the boundary 302a of the dynamic departure status zone 302b to extend the dynamic departure status zone 302b by a predetermined distance. In an exemplary embodiment, if the dynamic zone module 130 determines that the one or more status request signals are successfully sent and received for the predetermined number of successive arrivals, the dynamic zone module 130 may modify the distance between the boundary 302a and the barrier 104 to extend the dynamic departure status zone 302b. It is to be appreciated that during successive arrivals of the vehicle 102 after extending the dynamic departure status zone 302b by modifying the distance of the boundary 302a and the barrier 104, the dynamic zone module 130 may continually determine if the one or more status request signals are successfully sent to the transceiver 134 from the extended dynamic departure status zone 302b to thereby further extend the zone 302b or reduce the zone 302b.

If it determined that the at least one status request signal is not successfully sent and received during the predetermined number of successive arrivals (at block 616), the method 600 may proceed to block 620, wherein the method 600 may include modifying the location of the boundary 302a of the dynamic departure status zone 302b to reduce the dynamic departure status zone 302b by a predetermined distance. In one embodiment, if the dynamic zone module 130 determines that the one or more status request signals are not successfully sent and received for the predetermined number of successive departures, the dynamic zone module 130 may modify the distance between the boundary 302a and the barrier 104 to reduce the dynamic departure status zone 302b. It is to be appreciated that during successive departures of the vehicle 102 after reducing the dynamic departure status zone 302b by modifying the distance of the boundary 302a and the barrier 104, the dynamic zone module 130 may continually determine if the one or more status request signals are successfully sent to the transceiver 134 from the reduced dynamic departure status zone 302b to thereby further extend the zone 302b or reduce the zone 302b.

The method 600 may proceed to block 622, wherein the method 600 may include determining a plurality of GPS coordinates associated with the boundary 302a of the dynamic departure status zone 302b. In an exemplary embodiment, upon modifying the location of the boundary 302a of the dynamic departure status zone 302b (at block 618 or block 620), the dynamic zone module 130 may store a plurality of GPS coordinates associated with the boundary 302a. The plurality of GPS coordinates may be utilized by the location determinant module 128 to determine when the vehicle 102 exits the dynamic departure status zone 302b each time the vehicle 102 is determined to travel away from the barrier 104.

Figure 7:
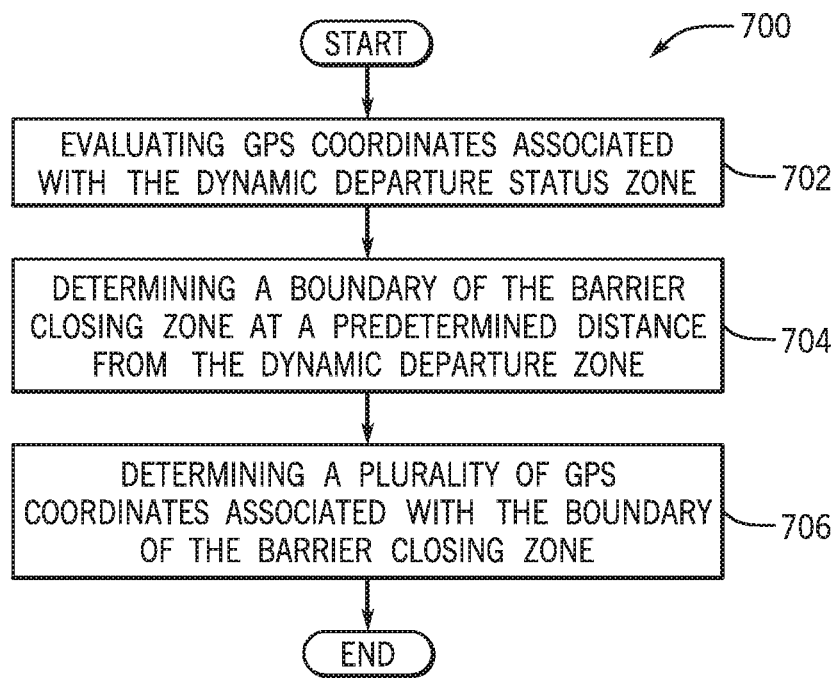
FIG. 7 is a process flow diagram of a method for determining at least one barrier closing zone associated with the barrier based on the at least one dynamic departure status zone according to an exemplary embodiment.

FIG. 7 is a process flow diagram of a method 700 for determining at least one barrier closing zone 304b associated with the barrier 104 based on the at least one dynamic departure status zone 302b according to an exemplary embodiment. FIG. 7 will be described with reference to the components of FIG. 1 and the illustrative example of FIG. 3, though it is to be appreciated that the method 700 of FIG. 7 may be executed with other systems, components, and/or examples. The method 700 may begin at block 702, wherein the method 700 may include evaluating GPS coordinates associated with the dynamic departure status zone 302b. In one embodiment, upon determining the plurality of GPS coordinates associated with the boundary 302a, the dynamic zone module 130 may communicate the plurality of GPS coordinates associated with the boundary 302a (in addition to storing them within the barrier profile) to the control zone module 132. The control zone module 132 may evaluate the plurality of GPS coordinates to determine the location of the boundary 302a of the dynamic departure status zone 302b with respect to the barrier 104.

The method 700 may proceed to block 704, wherein the method 700 may include determining a boundary 304a of the barrier closing zone 304b at a predetermined distance from the dynamic departure status zone 302b. In one embodiment, the control zone module 132 may determine the boundary 304a of the barrier closing zone 304b at a predetermined distance (e.g., 50 m) from the dynamic departure status zone 302b. Consequently, if the size and/or location of the dynamic departure status zone 302b is modified based on the execution of the method 600 of FIG. 6, the size and location of the barrier closing zone 304b may also be modified accordingly.

The method 700 may proceed to block 706, wherein the method 700 may include determining a plurality of GPS coordinates associated with the boundary 304a of the barrier opening zone 204b. In one embodiment, upon determining the boundary 304a, the control zone module 132 may store a plurality of GPS coordinates associated with the boundary 304a. More specifically, the control zone module 132 may communicate with the navigation system 126 to determine the plurality of GPS coordinates of the areas that include the boundary 304a and may update the barrier profile associated with the barrier 104 with the plurality of GPS coordinates. The plurality of GPS coordinates may be utilized by the location determinant module 128 to determine when the vehicle 102 exits the barrier closing zone 304b each time the vehicle 102 is determined to travel away from the barrier 104.

This functionality may continuously ensure that the location at which the barrier control signal(s) are sent to traverse the barrier 104 to the closed state is determined well in advance of the vehicle 102 exiting the dynamic departure status zone 302b to ensure that the barrier controller 108 is provided enough time to traverse the barrier 104 to the closed state and the current state of the barrier 104 may be determined at a latest point in time as possible to determine if the barrier 104 has (fully) traversed to the closed state to the driver of the vehicle 102.

Figure 8:
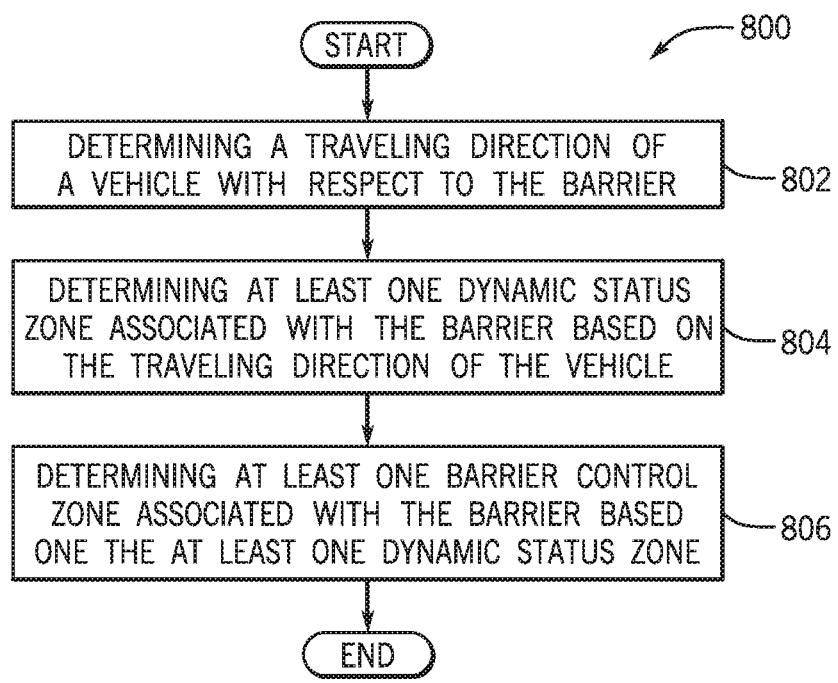
FIG. 8 is a process flow diagram of a method for determining at least one zone associated with automatic control of a barrier according to an exemplary embodiment.

FIG. 8 is a process flow diagram of a method 800 for determining at least one zone associated with automatic control of a barrier 104 according to an exemplary embodiment. FIG. 8 will be described with reference to the components of FIG. 1, though it is to be appreciated that the method 800 of FIG. 8 may be used with other system and/or components. The method 800 may begin at block 802, wherein the method 800 may include determining a traveling direction of a vehicle 102 with respect to the barrier 104.

The method 800 may proceed to block 804, wherein the method 800 may include determining at least one dynamic status zone associated with the barrier 104 based on the traveling direction of the vehicle 102. In one embodiment, the at least one dynamic departure zone may be modified based on maximum distance at which communication signals are exchanged between the vehicle 102 and the barrier controller 108 associated with the barrier 104.

The method 800 may proceed to block 806, wherein the method 800 may include determining at least one barrier control zone associated with the barrier 104 based on the at least one dynamic status zone. The at least one barrier control zone may be determined at a location that is based on a location of the at least one dynamic status zone.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for determining at least one zone associated with automatic control of a barrier, comprising:

determining a traveling direction of a vehicle with respect to the barrier;

determining at least one dynamic status zone associated with determining an operational status of the barrier based on the traveling direction of the vehicle, wherein the at least one dynamic status zone includes a boundary that is dynamically located based on a determined maximum distance at which communication signals are exchanged between the vehicle and a barrier controller associated with the barrier, wherein the at least one dynamic status zone is modified to increase a distance between the boundary of the at least one dynamic status zone based on successful successive receptions of a predetermined number of communication signals from a vehicle communication system of the vehicle to a transceiver operably connected to the barrier controller associated with the barrier; and determining at least one barrier control zone associated with the barrier based on the at least one dynamic status zone, wherein the at least one barrier control zone is provided at a location that is based on a location of the boundary of the at least one dynamic status zone.

2. The computer-implemented method of claim 1, wherein determining at least one dynamic status zone associated with the barrier includes determining that the direction of the travel of the vehicle includes an arrival of the vehicle towards the barrier, wherein at least one dynamic arrival status zone is determined that includes a boundary that is provided at a predetermined distance from the barrier.

3. The computer-implemented method of claim 2, wherein determining at least one dynamic status zone associated with the barrier includes modifying the at least one dynamic arrival status zone to increase a distance between the boundary of the at least one dynamic arrival status zone based on successful successive receptions of a predetermined number of communication signals from the vehicle communication system of the vehicle to the transceiver operably connected to the barrier controller associated with the barrier.

4. The computer-implemented method of claim 3, wherein determining at least one dynamic status zone associated with the barrier includes modifying the dynamic arrival status zone to decrease the distance between the boundary of the at least one dynamic arrival status zone based on unsuccessful successive receptions of the predetermined number of communication signals from the vehicle communication system to the transceiver.

5. The computer-implemented method of claim 4, wherein determining at least one barrier control zone associated with the barrier includes determining at least one barrier opening zone that includes a boundary that is provided at a predetermined distance from the dynamic arrival status zone.

6. The computer-implemented method of claim 1, wherein determining at least one dynamic status zone associated with the barrier includes determining that the direction of the travel of the vehicle includes a departure of the vehicle away from the barrier, wherein at least one dynamic departure status zone is determined that includes a boundary that is provided at a predetermined distance from the barrier.

7. The computer-implemented method of claim 6, wherein determining at least one dynamic status zone associated with the barrier includes modifying the at least one dynamic departure status zone to increase a distance between the boundary of the at least one dynamic departure status zone based on successful successive receptions of a predetermined number of communication signals from the vehicle communication system of the vehicle to the transceiver operably connected to the barrier controller associated with the barrier.

8. The computer-implemented method of claim 7, wherein determining at least one dynamic status zone associated with the barrier includes modifying the dynamic departure status zone to decrease the distance between the boundary of the at least one dynamic departure status zone based on unsuccessful successive receptions of the predetermined number of communication signals from the vehicle communication system to the transceiver.

9. The computer-implemented method of claim 8, wherein determining at least one barrier control zone associated with the barrier includes determining at least one barrier closing zone that includes a boundary that is provided at a predetermined distance from the dynamic departure status zone.

10. A system for determining at least one zone associated with automatic control of a barrier, comprising:
a memory storing instructions when executed by a processor cause the processor to:
determine a traveling direction of a vehicle with respect to the barrier;
determine at least one dynamic status zone associated with determining an operational status of the barrier based on the traveling direction of the vehicle, wherein the at least one dynamic status zone includes a boundary that is dynamically located based on a determined maximum distance at which communication signals are exchanged between the vehicle and a barrier controller associated with the barrier, wherein the at least one dynamic status zone is modified to increase a distance between the boundary of the at least one dynamic status zone based on successful successive receptions of a predetermined number of communication signals from a vehicle communication system of the vehicle to a transceiver operably connected to the barrier controller associated with the barrier; and
determine at least one barrier control zone associated with the barrier based on the at least one dynamic status zone, wherein the at least one barrier control zone is provided at a location that is based on a location of the boundary of the at least one dynamic status zone.

11. The system of claim 10, wherein determining at least one dynamic status zone associated with the barrier includes determining that the direction of the travel of the vehicle includes an arrival of the vehicle towards the barrier, wherein at least one dynamic arrival status zone is determined that includes a boundary that is provided at a predetermined distance from the barrier.

12. The system of claim 11, wherein determining at least one dynamic status zone associated with the barrier includes modifying the at least one dynamic arrival status zone to increase a distance between the boundary of the at least one dynamic arrival status zone based on successful successive receptions of a predetermined number of communication signals from the vehicle communication system of the vehicle to the transceiver operably connected to the barrier controller associated with the barrier.

13. The system of claim 12, wherein determining at least one dynamic status zone associated with the barrier includes modifying the dynamic arrival status zone to decrease the distance between the boundary of the at least one dynamic arrival status zone based on unsuccessful successive receptions of the predetermined number of communication signals from the vehicle communication system to the transceiver.

14. The system of claim 13, wherein determining at least one barrier control zone associated with the barrier includes determining at least one barrier opening zone that includes a boundary that is provided at a predetermined distance from the dynamic arrival status zone.

15. The system of claim 10, wherein determining at least one dynamic status zone associated with the barrier includes determining that the direction of the travel of the vehicle includes a departure of the vehicle away from the barrier, wherein at least one dynamic departure status zone is determined that includes a boundary that is provided at a predetermined distance from the barrier.

16. The system of claim 15, wherein determining at least one dynamic status zone associated with the barrier includes modifying the at least one dynamic departure status zone to increase a distance between the boundary of the at least one dynamic departure status zone based on successful successive receptions of a predetermined number of communication signals from the vehicle communication system of the vehicle to the transceiver operably connected to the barrier controller associated with the barrier.

17. The system of claim 16, wherein determining at least one dynamic status zone associated with the barrier includes modifying the dynamic departure status zone to decrease the distance between the boundary of the at least one dynamic departure status zone based on unsuccessful successive receptions of the predetermined number of communication signals from the vehicle communication system to the transceiver.

18. The system of claim 17, wherein determining at least one barrier control zone associated with the barrier includes determining at least one barrier closing zone that includes a boundary that is provided at a predetermined distance from the dynamic departure status zone.

19. A non-transitory computer readable storage medium storing instructions that when executed by a computer, which includes a processor perform a method, the method comprising:
  determining a traveling direction of a vehicle with respect to a barrier;
  determining at least one dynamic status zone associated with determining an operational status of the barrier based on the traveling direction of the vehicle, wherein the at least one dynamic status zone includes a boundary that is dynamically located based on a determined maximum distance at which communication signals are exchanged between the vehicle and a barrier controller associated with the barrier, wherein the at least one dynamic status zone is modified to increase a distance between the boundary of the at least one dynamic status zone based on successful successive receptions of a predetermined number of communication signals from a vehicle communication system of the vehicle to a transceiver operably connected to the barrier controller associated with the barrier; and
  determining at least one barrier control zone associated with the barrier based on the at least one dynamic status zone, wherein the at least one barrier control zone is provided at a location that is based on a location of the boundary of the at least one dynamic status zone.

20. The non-transitory computer readable storage medium of claim 19, wherein determining at least one dynamic status zone associated with the barrier includes modifying at least one dynamic arrival status zone or at least one dynamic departure status zone to increase a distance between a boundary of the at least one dynamic arrival status zone or a boundary of the at least one dynamic departure status zone based on successful successive receptions of a predetermined number of communication signals from the vehicle communication system of the vehicle to the transceiver operably connected to the barrier controller associated with the barrier.

* * * * *